(12) United States Patent
Uchiumi et al.

(10) Patent No.: US 7,427,045 B2
(45) Date of Patent: Sep. 23, 2008

(54) TAPE WINDER AND METHOD OF PROCESSING TAPE

(75) Inventors: Kyouhisa Uchiumi, Kanagawa (JP); Kouichi Nakatogawa, Kanagawa (JP)

(73) Assignee: FUJIFILM Corporation, Tokyo (JP)

( * ) Notice: Subject to any disclaimer, the term of this patent is extended or adjusted under 35 U.S.C. 154(b) by 414 days.

(21) Appl. No.: 11/287,310

(22) Filed: Nov. 28, 2005

(65) Prior Publication Data

US 2006/0192045 A1    Aug. 31, 2006

(30) Foreign Application Priority Data

Dec. 9, 2004   (JP)   ............... 2004-356190
Jan. 12, 2005  (JP)   ............... 2005-004716
Jan. 28, 2005  (JP)   ............... 2005-020498

(51) Int. Cl.
    *B65H 18/26*   (2006.01)
(52) U.S. Cl. .................. 242/547; 242/548.2; 242/548.3
(58) Field of Classification Search ................ 242/547, 242/548, 548.2, 548.3, 346.2
    See application file for complete search history.

(56) References Cited

U.S. PATENT DOCUMENTS

| | | | | |
|---|---|---|---|---|
| 2,914,267 A | * | 11/1959 | Means ..................... | 242/547 |
| 4,842,210 A | * | 6/1989 | Kubota et al. ............. | 242/548.4 |
| 5,039,023 A | * | 8/1991 | Hagens et al. ............. | 242/547 |
| 5,533,690 A | * | 7/1996 | Kline et al. ............... | 242/547 |
| 6,045,086 A | * | 4/2000 | Jeans ...................... | 242/548.3 |
| 6,450,438 B1 | * | 9/2002 | McAllister et al. ......... | 242/548.3 |
| 6,644,581 B2 | * | 11/2003 | Plourde et al. ............ | 242/346.2 |
| 2003/0122026 A1 | * | 7/2003 | Lake et al. ................ | 242/548 |

FOREIGN PATENT DOCUMENTS

| | | |
|---|---|---|
| JP | 62-31645 A | 2/1987 |
| JP | 9-138945 A | 5/1997 |
| JP | 2003-346454 A | 12/2003 |
| JP | 2004-5774 A | 1/2004 |

* cited by examiner

*Primary Examiner*—William A Rivera
(74) *Attorney, Agent, or Firm*—Sughrue Mion, PLLC

(57) ABSTRACT

A tape winder includes: a hub, around which a tape is wound overlappingly and which forms a tape roll on the hub; a first guide roller, defining the position of feeding of the tape into the tape roll being formed on the hub while pressing an outer peripheral surface of the tape roll; and a moving mechanism, moving the first guide roller away from the rotation axis of the hub as the tape roll increases in diameter. A rotation axis of the first guide roller is positioned along a normal to a reference surface and the rotation axis of the hub intersects the rotation axis of the first guide roller at an angle θ. The tape is processed to provide winding curl to the tape through winding the tape on a tapered hub with inclination and a heat treatment to fix the winding curl.

13 Claims, 20 Drawing Sheets

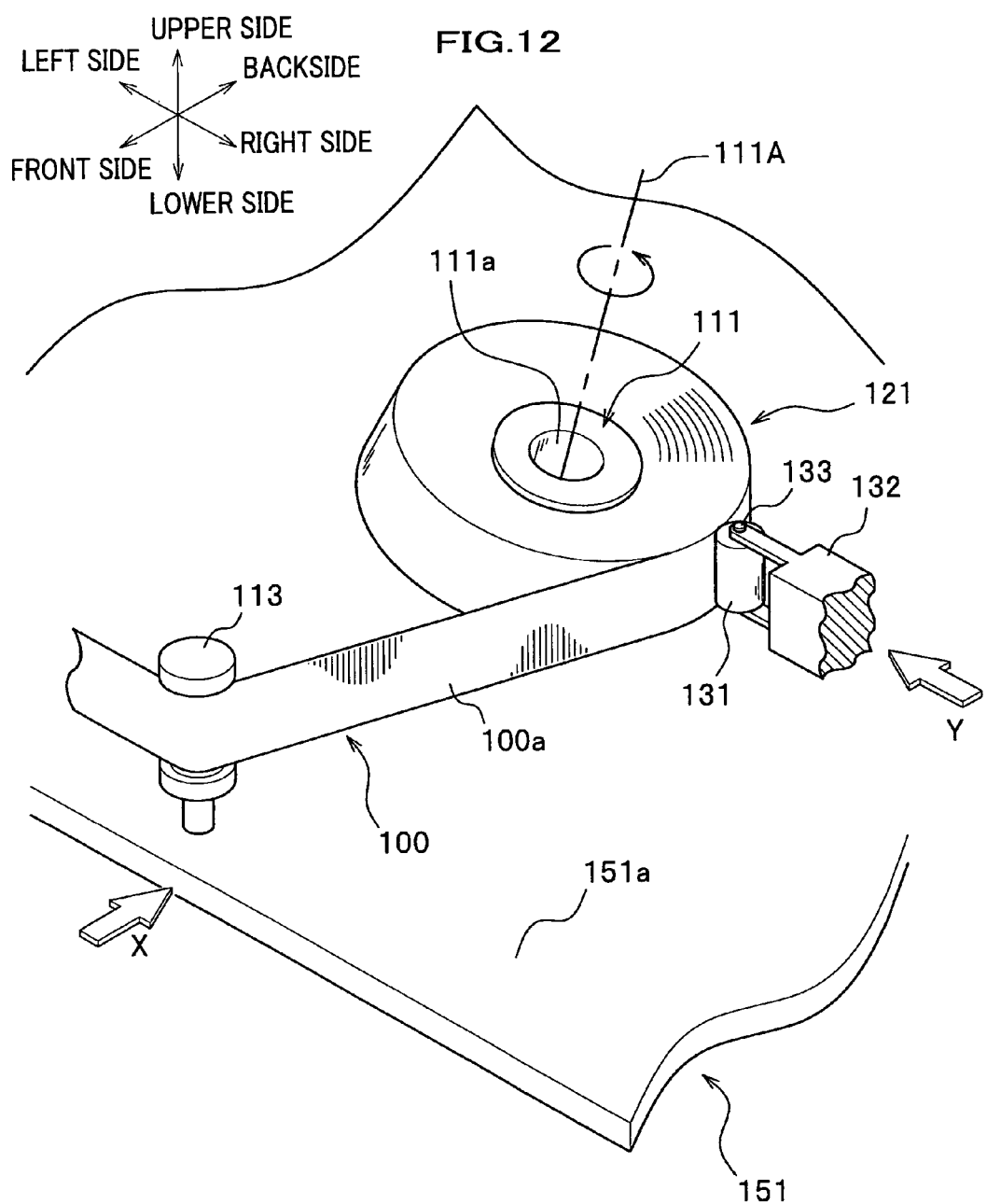

TAPE WINDER AND METHOD OF PROCESSING TAPE

BACKGROUND OF THE INVENTION

1. Field of the Invention

This invention relates to a tape winder for winding a tape in a roll form and relates to a method of processing a tape wound in a roll form.

2. Description of the Related Art

In general, magnetic tapes, for example, of 12.7 mm (½ inch) width for linear or helical heads are widely used as external storage media for data backup for computers, etc. Such a magnetic tape has an overall thickness of no more than 10 µm and has a total of two or more magnetic layers (total thickness: no more than 0.3 µm) formed on top and back surfaces of a resin film of PET, PEN, aramid, etc.

Though such a magnetic tape is handled in a state of being wound around a tape reel, in the process of being wound around the tape reel by a winder or a drive, winding disturbance, with which the tape edges become misaligned, tends to occur. Winding disturbance becomes especially noticeable in the winding of magnetic tape at high speed. Since the tape edges are misaligned, a magnetic tape with which winding disturbance has occurred is readily damaged, for example, during its transport.

Such winding disturbance leads to the retention of winding defects during storage and causes degradation of the precision of tape travel within a drive and servo tracking errors. Thus to ensuring the required performance of a product, it is important to manufacture magnetic tapes, which can be wound around tape reels without giving rise to winding disturbance, provide good winding forms to be secured at the time of shipping, and do not undergo winding disturbance readily in drives.

It is known that when a magnetic tape is provided with a predetermined curved form, a good winding form is secured, tape travel is stabilized, and the servo tracking performance is improved. For example, when a magnetic tape is formed so as to be curved with respect to a reference line that joins the respective ends in the length direction, a good winding form is provided. On the other hand, when a fixed curving shape cannot be obtained, the winding form degrades.

Various technologies have thus been proposed to provide a tape with a predetermined curved form to obtain a good winding form.

For example, Japanese Laid-open Patent Application Publication No. 2003-346454 discloses, as a magnetic tape with which winding disturbance does not occur readily, a magnetic tape MT, which is curved in the width direction along its entire length as shown in FIG. 21A.

As shown in FIG. 21B, such a curved magnetic tape MT is wound around a tape reel R with its tape edge TE at the concave side contacting a flange surface FS. Since the magnetic tape MT is thus wound with a tape edge TE being set along flange surface FS, winding disturbance does not occur readily with magnetic tape MT.

A method of manufacturing this magnetic tape, disclosed in Japanese Laid-open Patent Application Publication No. 2003-346454, comprises: a winding step of winding the magnetic tape MT around a flange-less hub so that the tape becomes a bowl-like tape roll; and an aging step of providing the magnetic tape MT with a winding curl by applying an aging process to this bowl-like tape roll.

In the abovementioned winding step, the magnetic tape MT is wound around the hub while being pressed by a touch roller, the rotation axis of which is inclined at 0.02 to 2° with respect to the rotation axis of the hub, and the magnetic tape MT is thereby made a bowl-like tape roll around the hub. Also, in the abovementioned aging step, by the magnetic tape MT being provided with the abovementioned winding curl, magnetic tape MT becomes curved in its width direction.

As another method of providing magnetic tape MT with curvature, there is known, for example, a method, disclosed in Japanese Laid-open Patent Application Publication No. 2004-5774, wherein the magnetic tape is wound around a hub having different flexure strengths at one end face side and at the other end face side.

There is also known a method, disclosed in Japanese Laid-open Patent Application Publication No. Hei 9-138945, wherein a taper is formed in the hub of a tape reel and the magnetic tape is provided with a winding curl, with which winding disturbance does not occur readily, by means of this taper.

However, with the art disclosed in Japanese Laid-open Patent Application Publication No. 2003-346454, a wide (for example, a 12.7 mm (½ inch) wide) tape could not be provided adequately with a curvature by simple winding in some cases due to a high rigidity. Also, even if curvature was provided, the curvature was small. Furthermore, after being wound, the curvature of the tape tended to change readily with time and the securing of the quality at the time of shipping or the quality in the market after sales was difficult.

With the art disclosed in Japanese Laid-open Patent Application Publication No. 2004-5774 and Japanese Laid-open Patent Application Publication No. Hei 9-138945, as winding proceeds (as a wound roll becomes thicker), the effect of the taper diminishes due to air layers between the tape, thickness differences in the width direction of the tape, microscopic burrs at the edges of the magnetic tape, etc., and a winding curl could not be provided readily to the magnetic tape at the outer side of the wound roll. Also, due to manufacturing errors, there were cases where a curvature of the magnetic tape varies in a length direction and dispersion of the tape curvature occurs even at positions close to the hub.

Conventionally, a magnetic tape is manufactured by cutting a wide original magnetic tape fabric into a plurality of narrow bands and winding the cut bands around flange-less reels.

As a magnetic tape winder for this process, there is known a magnetic tape winder equipped with a touch roller, which presses the magnetic tape that is wound around a reel, in other words, a tape roll, and a restricting guide roller, which restricts wobbling in the width direction of the magnetic tape that is fed into the tape roll (see for example, Japanese Laid-open Patent Application Publication No. Sho 62-31645).

With this magnetic tape winder, the touch roller and the restricting guide roller are supported integrally by a plate-like member and the touch roller and the restricting guide roller are mounted, via the plate-like member, to the swinging end of a swinging arm. With this magnetic tape winder, by the swinging arm swinging towards the tape roll side, the touch roller and the restricting guide roller are pressed against the tape roll (surface of the magnetic tape) that gradually increases in diameter.

As a result, with this magnetic tape winder, falling off of the tape roll due to slipping of the wound magnetic tape with respect to itself and edge damage due to winding disturbance of the magnetic tape are avoided.

However, with the making of magnetic tapes higher in storage capacity recently, magnetic tapes are becoming thinner in thickness and since, and with the realization of high recording densities, the surfaces of magnetic tapes are being made smoother. Thus, the magnetic tapes are becoming lower in rigidity and the magnetic tape that is wound around a hub is becoming more slippery with respect to itself. Thus, with the magnetic tape winder of Japanese Laid-open Patent Application Publication No. Sho 62-31645, due to the lowering of the rigidity of the tape edges, the force of restricting the wobbling of the magnetic tape in the width direction by the restricting guide roller is becoming insufficient and winding disturbance of the magnetic tape is tending to occur readily.

Generally even if a heat treatment is applied to the magnetic tape (tape roll), with which such a winding disturbance has occurred, a good winding curl cannot be provided to the magnetic tape.

Also, since a magnetic tape slips readily with respect to itself, a magnetic tape that is being wound around a hub falls off readily from the hub. This trend is especially significant in a magnetic tape that is wound around a hub at high speed and has been a major impediment to improving the productivity of magnetic tapes.

There was thus a need for a tape winder that can prevent winding disturbance of a tape that is to be wound into a roll form and prevent the tape that has been wound around a hub from falling off the hub even if the tape is thin in thickness and the wound tape slips readily with respect to itself.

There was also a need for a tape processing method that enables a tape, with which winding disturbance does not occur readily and which is high in travel stability, to be manufactured by simple steps.

SUMMARY OF THE INVENTION

An aspect of the present invention provides a tape winder comprising: a hub, around which a tape is wound overlappingly and which thereby forms a tape roll on the outer peripheral surface thereof; a first guide roller, defining the position of feeding of the tape onto the abovementioned tape roll being formed on the abovementioned hub while pressing an outer peripheral surface of the abovementioned tape roll; and a moving mechanism, moving the abovementioned first guide roller away from the rotation axis of the abovementioned hub as the abovementioned tape roll increases in diameter, wherein the rotation axis of the abovementioned hub intersects the rotation axis of the abovementioned first guide roller at an angle $\theta$.

Here, preferably, a second guide roller, positioned at the opposite side of the abovementioned first guide roller across the abovementioned hub and restricting wobbling in the width direction of the tape, wound overlappingly around the outer peripheral surface of the abovementioned tape roll, while pressing the outer peripheral surface of the tape roll; and a second moving mechanism, moving the abovementioned second guide roller away from the rotation axis of the abovementioned hub as the abovementioned tape roll increases in diameter; are equipped, with the direction in which the abovementioned second guide roller moves away from the rotation axis of the abovementioned hub forming an angle $2\theta$ with respect to the abovementioned reference surface.

With this tape winder, preferably, as the tape roll is formed with the hub rotating about its rotation axis, the first guide roller and the second guide roller are moved by the moving mechanisms so as to move away from the rotation axis of the hub as the tape roll increases in diameter. As a result, each of the first guide roller and the second guide roller generates a uniform pressing force across the entire circumference of the tape roll while moving so as to track the outer peripheral surface of the tape roll that gradually increases in diameter.

With this tape winder, since the rotation axis of the hub intersects the rotation axis of the first guide roller at the angle $\theta$, preferably, the direction in which the tape roll increases in diameter is set to the angle $\theta$ with respect to the radial direction of the hub. Consequently, a bowl-like tape roll, which rises from the hub at the angle $\theta$ with respect to the radial direction of the hub, is formed.

As such a bowl-like tape roll is formed in this tape winder, preferably, the first guide roller defines the position of feeding of tape onto the tape roll while pressing the outer peripheral surface of the tape roll and the second guide roller restricts wobbling in the width direction of the tape that is wound overlappingly around the outer peripheral surface of the tape roll while pressing the outer peripheral surface of the tape roll at the opposite side of the first guide roller. As a result, the present tape winder prevents winding disturbance of the tape on the tape roll and prevents the tape wound around the hub from falling off the hub even if the tape that is wound around the hub is thin in thickness and the wound tape slips readily with respect to itself.

Also with this tape winder, though the abovementioned hub may have a cylindrical shape, the outer peripheral surface of the abovementioned hub may be tapered and inclined with respect to the rotation axis of the abovementioned hub. In particular, the outer peripheral surface is preferably tapered and inclined at an angle close to the abovementioned angle $\theta$ with respect to the rotation axis of the abovementioned hub and is most preferably tapered and inclined at an angle equal to the abovementioned angle $\theta$.

With the tape winder having the hub with the outer peripheral surface of the abovementioned angle $\theta$, since the rotation axis of the hub intersects the rotation axis of the first guide roller at the angle $\theta$ as mentioned above, preferably, the taper angle of the hub at the position of the first guide roller matches the angle of the rotation axis of the first guide roller. Consequently, the first guide roller appropriately contacts a surface of the tape (the outer peripheral surface of the tape roll) that is wound overlappingly around the outer peripheral surface of the hub. Since the first guide roller thus presses the outer peripheral surface of the tape roll uniformly and appropriately in this tape winder, a bowl-like tape roll of better winding form is formed. With the tape winder equipped with the cylindrical hub, since the rotation axis of the hub intersects the rotation axis of the first guide roller at the angle $\theta$, a tapered pressing force, with which a gradient in the strength of the pressing force is formed in the width direction of the tape, is generated on the hub.

With the present tape winder, preferably, the second guide roller is positioned exactly opposite to the first guide roller across the rotation axis of the abovementioned hub. The second guide roller is, preferably, moved by the second moving mechanism so as to move away from the rotation axis of the hub as the tape roll increases in diameter. In this process, the second guide roller moves away from the rotation axis of the hub in the direction of the angle $2\theta$ with respect to the reference surface. Meanwhile, since the rotation axis of the hub intersects the rotation axis of the first guide roller at the angle $\theta$, preferably, the direction in which the tape roll increases in diameter at the position of the second guide roller forms the angle $2\theta$ with respect to the reference surface. Preferably, the direction in which the second guide roller moves away from the rotation axis of the hub is thus matched with the direction in which the tape roll increases in diameter at the position of the second guide roller. The second guide roller may restrict wobbling in the width direction of the tape that is wound overlappingly around the outer peripheral surface of the tape roll while pressing the outer peripheral surface of the tape roll. Thus, preferably, this tape winder forms a bowl-like tap roll of better winding form.

With this tape winder, the abovementioned second guide roller is preferably freely movable in the width direction of the abovementioned tape.

With this tape winder, even when for example due to scattering of the precision of assembly of the tape winder, there are some deviations in the relative position of the second guide roller with respect to the first guide roller among individual tape winders, since the second guide roller is, preferably, freely movable in the width direction of the tape, such deviations are absorbed. Consequently with this tape winder, damaging of the tape edge may be reduced in comparison to an arrangement wherein the second guide roller is not freely movable.

Preferably with this tape winder, a pair of flanges, which restrict wobbling in the width direction of the tape, are formed respectively at an upper edge and a lower edge of the outer peripheral surface of each of the abovementioned first guide roller and the abovementioned second guide roller, and the width between inner circumferences of the abovementioned flanges may be 15 µm greater than the width of the tape.

With this tape winder, the tape winding form can be improved in the case where the tape is wound around the hub at a fixed speed.

Preferably with this tape winder, a pair of flanges, which restrict wobbling in the width direction of the tape, are formed respectively at an upper edge and a lower edge of the outer peripheral surface of each of the abovementioned first guide roller and the abovementioned second guide roller, and the width between outer circumferences of the abovementioned flanges is 20 to 100 µm greater than the width of the tape.

With this tape winder, the tape winding form under acceleration of the tape winding speed can be improved.

Also with this tape winder, the height of each flange formed on the abovementioned first guide roller and the second guide roller is preferably 0.5 to 2.0 mm.

With this tape winder, since the height of each flange formed on the abovementioned first guide roller and the second guide roller is set in the abovementioned numerical range, the position of the tape on the hub can be stabilized at the start of winding of the tape around the hub and the deviation of the tape from the first guide roller and the second guide roller can be prevented appropriately.

Also preferably, this tape winder is furthermore equipped with actuators, attached respectively to the abovementioned first guide roller and the abovementioned second guide roller and individually generating the respective pressing forces of the abovementioned first guide roller and the abovementioned second guide roller against the outer peripheral surface of the abovementioned tape roll.

With this tape winder, the respective pressing forces of the abovementioned first guide roller and the abovementioned second guide roller against the outer peripheral surface of the tape roll can be adjusted. Thus with this tape winder, the pressing forces, with which the respective performance of the first guide roller and the second guide roller can be adequately exhibited individually, can be set accurately and yet easily. As a result, winding disturbance of the tape can be prevented across the entire length of the tape (from the start of winding to the end of winding) and the falling off of the tape roll from the hub can be prevented even if the tape that is wound around the hub is thin in thickness and the wound tape slips readily with respect to itself.

This tape winder is preferably furthermore equipped with a touch roller, positioned at the downstream side of the traveling tape with respect to the abovementioned first guide roller and pressing the outer peripheral surface of the abovementioned tape roll.

With this tape winder, preferably, the tape that is overlappingly wound around the outer peripheral surface of the tape roll is pressed by the touch roller that is positioned at the downstream side of the first guide roller. Consequently, air that is entrained between the tape roll and newly wound tape may be pushed out efficiently. This tape winder thus forms a bowl-like tape roll of better winding form.

This tape winder is preferably furthermore equipped with an actuator, attached to the abovementioned touch roller and generating a pressing force of the abovementioned touch roller against the outer peripheral surface of the abovementioned tape roll separately from the abovementioned first guide roller and the abovementioned second guide roller.

With such a tape winder, since the first guide roller, the second guide roller, and the touch roller are excellent in the property of tracking the outer peripheral surface of the tape roll, even if there is some decentering or inclination of the rotation axis of the reel, these can be tolerated and the tape roll can be made satisfactory in winding form.

Also preferably with this tape winder, the respective abovementioned actuators are arranged to press the abovementioned touch roller and the abovementioned restricting guide rollers respectively towards the outer peripheral surface of the abovementioned tape roll via dampers.

With this tape winder, since the actuators press the touch roller and the restricting guide rollers via dampers, the touch roller and the restricting guide rollers may be improved further in the property of tracking the outer peripheral surface of the tape roll.

Such a tape winder may furthermore be equipped with: a slider, onto which the abovementioned touch roller is mounted; sliders, onto which the abovementioned restricting guide rollers are mounted; and guide rails, guiding the respective abovementioned sliders towards the abovementioned tape roll; and with this tape winder, the respective abovementioned actuators may be linear actuators that move the respective abovementioned sliders individually.

With this tape winder, by the linear actuators moving the respective sliders individually, preferably, the respective sliders are moved respectively towards the tape roll while being guided by the guide rails. The touch roller and the restricting guide rollers that are mounted on the respective sliders individually may press the outer peripheral surface of the tape roll.

Another aspect of the present invention provides a tape processing method comprising: a first step, wherein while a tape, having a base film and traveling with the base film being perpendicular to a reference surface, is wound around a hub, having a taper formed on an outer peripheral surface so that one side is made smaller in diameter, an outermost peripheral surface of a wound roll formed by the abovementioned tape being wound is pressed by a roller; and a second step of heat treating the abovementioned wound roll within a predetermined temperature range directly below the glass transition temperature of the abovementioned base film; and wherein in the abovementioned first step, the rotation axis of the abovementioned hub is inclined with respect to a normal to the abovementioned reference surface.

With such a tape processing method, by the rotation axis of the abovementioned hub being inclined with respect to the normal to the reference plane, a wound roll, with which the radius at one side is smaller than the radius at the other side, can be obtained. By then heat treating this wound roll, a tape that is provided with a curvature and is thus made shorter at one side can be obtained.

Thus with the tape that is provided with the predetermined curvature and is made shorter at one side, winding disturbance will not occur readily even if the tape is wound around another tape reel. Also, since the tape is provided with the predetermined curvature, the travel stability in a tape drive, etc., may be made high.

Here, preferably in the abovementioned first step, the rotation axis of the abovementioned hub is inclined towards the position at which the abovementioned tape enters the abovementioned wound roll or towards the opposite side of the entry position.

With this tape processing method, by the rotation axis of the hub being inclined towards the position at which the tape enters the wound roll or towards the opposite side of the entry position, a wound roll, with which the radius at the one side is smaller than the radius at the other side, can be obtained definitely.

Also, preferably in the abovementioned first step, the abovementioned roller is moved away towards the outer side in the radial direction of the abovementioned hub and is inclined towards the abovementioned one side in accompaniment with the winding of the abovementioned tape.

With such a tape processing method, by inclining the roller towards the one side while moving the roller away towards the outer side in the radial direction of the abovementioned hub in accompaniment with the winding of the tape, a wound roll, with which the difference between the radius at the one side and the radius at the other side is large, can be obtained.

Also preferably in the abovementioned first step, the vicinity of the position at which the tape enters the abovementioned wound roll is pressed by the abovementioned roller.

With such a tape processing method, by the pressing by the roller of the vicinity of the position at which the tape enters the wound roll, a wound roll, with which the radius at the one side is smaller than the radius at the other side, can be obtained definitely.

Furthermore, preferably in the abovementioned first step, the rotation axis of the abovementioned hub is inclined in the direction of progress of the tape immediately prior to entering the abovementioned wound roll or in the direction opposite to this direction of progress and the abovementioned roller presses the vicinity of the position at which the abovementioned tape enters the abovementioned wound roll to bend the direction of progress of the abovementioned tape in the direction of rotation of the hub.

By such a tape processing method, by inclining the rotation axis of the hub in the direction of progress of the tape immediately prior to entering the wound roll or in the direction opposite to the direction of progress and pressing the vicinity of the entry position by means of the roller to bend the direction of progress of the tape in the direction of rotation of the hub, a wound roll, with which the radius at the one side is smaller than the radius at the other side, can be obtained definitely.

Also preferably, the abovementioned roller has flanges that restrict the abovementioned tape in the width direction.

By such a tape processing method, the tape can be pressed by the roller while restricting the tape in the width direction by means of the flanges of the roller.

Furthermore, preferably in the abovementioned first step, the outermost peripheral surface of the abovementioned wound roll is also pressed by another roller besides the abovementioned roller.

With such a tape processing method, by the pressing of the outermost peripheral surface of the wound roll by another roller as well, the tape may become readily wound in accordance with (along) the outer peripheral surface of the hub, enabling a wound roll, with which the radius at the one side is smaller than the radius at the other side, to be obtained readily. There may be a plurality of other rollers.

The tape processing method may further comprise a step of making the abovementioned one side of the abovementioned tape thin prior to the abovementioned first step.

With such a tape processing method, by there furthermore being a step of extending and thinning the abovementioned one side of the abovementioned tape, a wound roll, with which the difference between the radius at the one side and the radius at the other side is large, can be obtained.

With the tape winder even if a tape that is to be wound into a roll form is thin in thickness and the wound tape slips readily with respect to itself, winding disturbance of the tape can be prevented and tape that has been wound around a hub can be prevented from falling off the hub.

With the tape processing method, a tape, with which winding disturbance may not occur readily and which is high in travel stability, can be manufactured by simple steps.

BRIEF DESCRIPTION OF THE DRAWINGS

The object and features of the present invention will become more readily apparent from the following detailed description taken in conjunction with the accompanying drawings in which:

FIG. 12 is a perspective view of the circumstances of winding of a magnetic tape by a tape processing method of a first embodiment;

FIGS. 13A and 13B are views taken along the X direction shown in FIG. 12 of the circumstances of winding of the magnetic tape by the tape processing method of the first embodiment, in which FIG. 13A shows a first stage and FIG. 13B shows a second stage;

FIGS. 17A and 17B are side views taken along the X direction shown in FIG. 12 of the circumstances of winding of a magnetic tape by a tape processing method of a second embodiment, in which FIG. 17A shows a first stage and FIG. 17B shows a second stage;

FIGS. 19A and 19B are side views taken along the Y direction shown in FIG. 12 of the circumstances of winding of a magnetic tape by a tape processing method of a third embodiment, in which FIG. 19A shows a first stage and FIG. 19B shows a second stage;

The same or corresponding elements or parts are designated with like references throughout the drawings.

DETAILED DESCRIPTION OF THE INVENTION

First Embodiment

<<Tape Winder>>

Tape winders of embodiments of this invention shall now be described with reference to the drawings.

Figure 1:
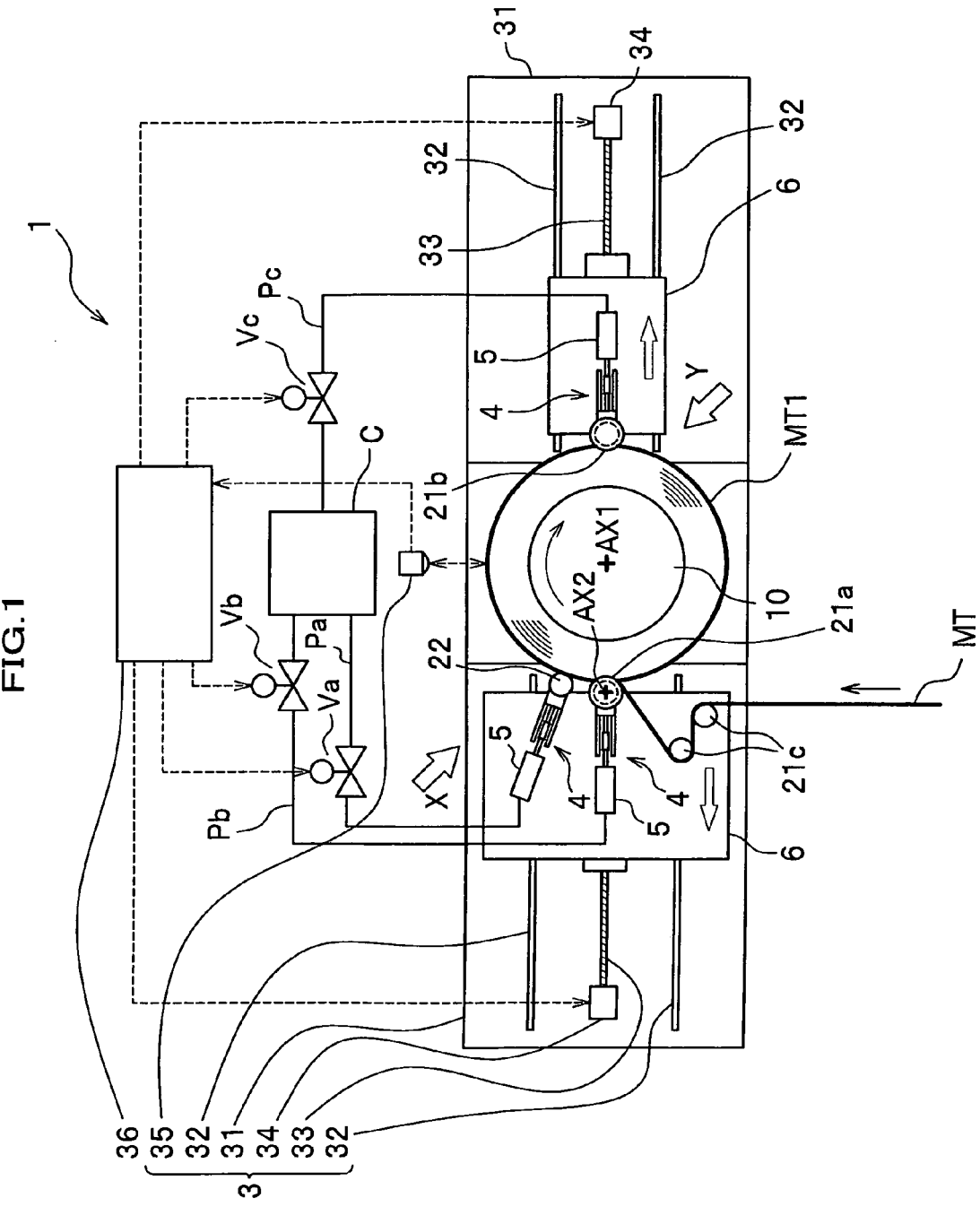
FIG. 1 is an explanatory arrangement diagram for describing the arrangement of a tape winder of an embodiment.

As shown in FIG. 1, a magnetic tape winder 1 (tape winder) comprises a hub 10, a first guide roller 21a, a second guide roller 21b, a touch roller 22, guiding mechanisms 4, linear air cylinders 5, and mobile supporting members 6 for the first guide roller 21a, the second guide roller 21b, and the touch roller 22, a moving mechanism 3 for moving mobile supporting members 6, and a control unit 36, which controls the actions of linear air cylinders 5 and the moving mechanism 3.

The linear air cylinders 5 are a kind of actuators.

Figure 2:
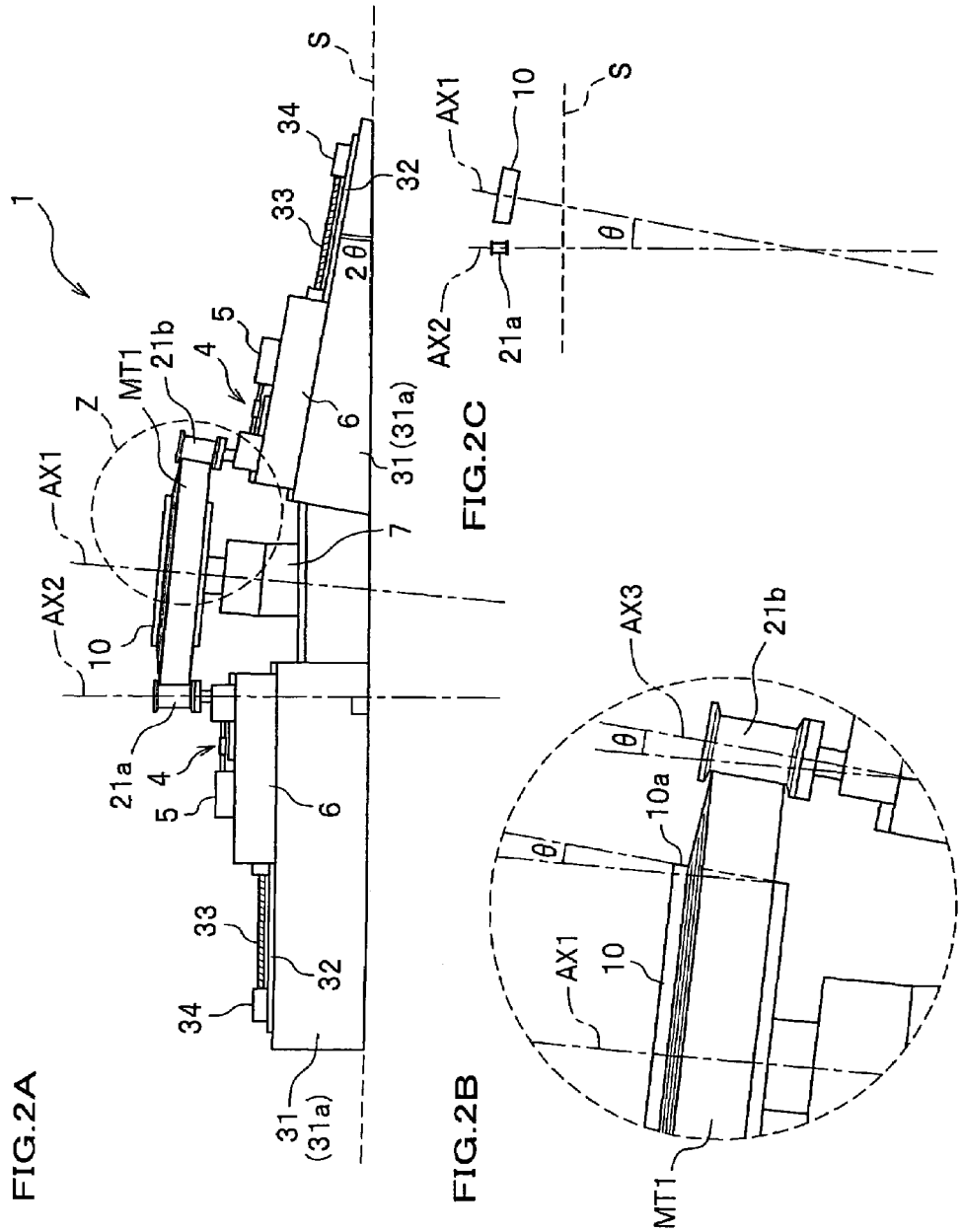
FIG. 2A is a side view of the external appearance of the tape winder of the embodiment.
FIG. 2B is a partially enlarged view of the Z portion in FIG. 2A.
FIG. 2C is a schematic view of the positional relationship between the rotation axis of a first guide roller and the rotation axis of a hub.

As shown in FIG. 2A, hub 10 is formed of a flange-less winding core and is made to rotate about a rotation axis AX1 by a drive motor 7. As shown in FIG. 2B, an outer peripheral surface 10a of hub 10 is tapered and inclined at an angle θ with respect to rotation axis AX1 of hub 10. With the present embodiment, the angle θ is preferably set to 0.1 to 1 degree.

As shown in FIG. 2C, rotation axis AX1 of hub 10 intersects a rotation axis AX2 of first guide roller 21a, to be described later, at the angle θ. As shown in FIG. 1, a tape roll MT1 is formed by a magnetic tape MT being wound around hub 10.

As shown in FIG. 1, when magnetic tape MT is fed towards tape roll MT1 via crown rollers 21c, first guide roller 21a defines the position at which magnetic tape MT is wound on tape roll MT1 while pressing an outer peripheral surface of tape roll MT1. First guide roller 21a thus feeds magnetic tape MT to tape roll MT1 while pressing the outer peripheral surface of tape roll MT1 and restricting wobbling in the width direction of the traveling magnetic tape MT.

With the present embodiment, the pressing force of first guide roller 21a against tape roll MT1 is set to be 0.20 to 0.98N (20 to 100 gf) greater than tape tension of the traveling magnetic tape MT. Also with this embodiment, first guide roller 21a is positioned so as to be aligned with touch roller 22, to be described later, at the upstream side of the traveling magnetic tape MT with respect to touch roller 22. Also as shown in FIG. 2A, rotation axis AX2 of first guide roller 21a is positioned along a normal to a reference surface S, which is the installation surface of magnetic tape winder 1. Since as mentioned above, rotation axis AX1 of hub 10 is inclined at the angle θ with respect to rotation axis AX2 of first guide roller 21a and the taper angle of outer peripheral surface 10a (see FIG. 2B) of hub 10 forms the angle θ with respect to rotation axis AX1 of hub 10, the angle of rotation axis AX2 of first guide roller 21a is matched with the taper angle of outer peripheral surface 10a of hub 10 at the position of first guide roller 21a.

Figure 3:
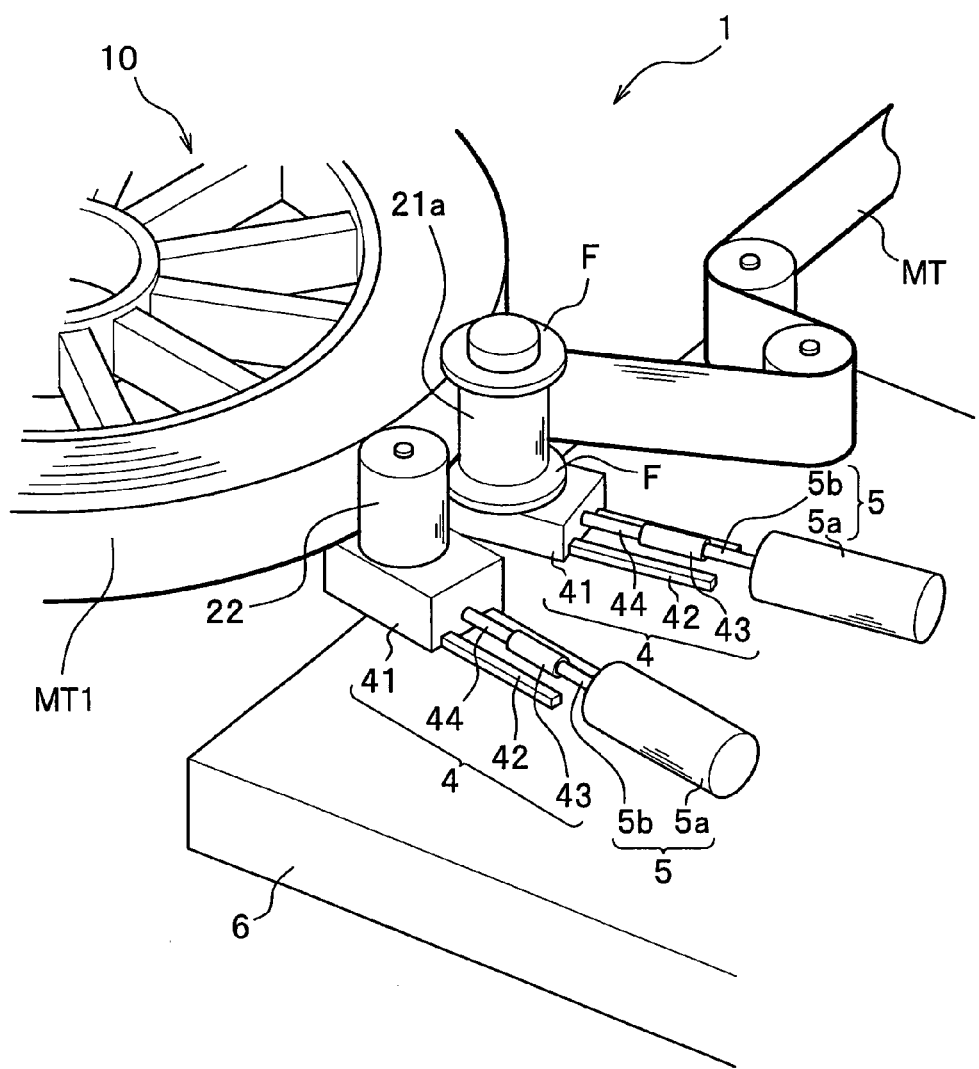
FIG. 3 is an external perspective view, as viewed from the X direction in FIG. 1, of the state of the vicinity of the first guide roller and a touch roller of the tape winder of the embodiment.
Figure 4A:
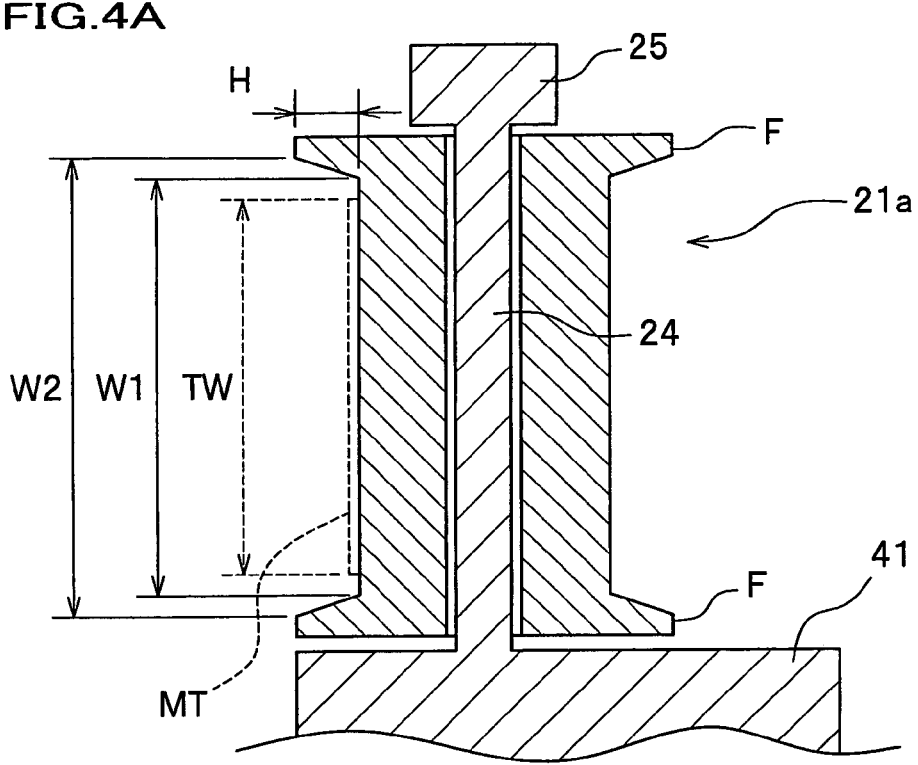
FIG. 4A is a sectional view of the first guide roller.

As shown in FIG. 3, first guide roller 21a has a pair of flanges F formed respectively at an upper edge and a lower edge of an outer peripheral surface of its cylindrical trunk portion to restrict wobbling of magnetic tape MT in the width direction. As shown in FIG. 4A, flanges F of first guide roller 21a of the present embodiment have taper cross sections. Thus, the width (interval) W1 between inner circumferences of flanges F along a circumference of the cylindrical trunk portion is set to be 5 to 15 μm greater than the width TW of magnetic tape MT. The width (interval) W2 between outer circumferences (edges) of flanges F is set to be 20 to 100 μm greater than the width TW of magnetic tape MT. Also, the height H of each flange F is set to 0.5 to 2.0 mm. When this height H is below the abovementioned lower limit, magnetic tape MT may be dislocated from first guide roller 21a and when the upper limit is exceeded, the position of magnetic tape MT on the reel may not stabilize at the start of winding of magnetic tape MT.

As shown in FIG. 4A, first guide roller 21a is mounted on an axial member 24, disposed so as to extend upward from a slider 41. This slider 41 makes up a guiding mechanism 4 (see FIG. 3), to be described later, for guiding first guide roller 21a towards tape roll MT1. At the tip of axial member 24 is formed a detachment preventing member 25 that prevents first guide roller 21a from becoming detached from axial member 24.

As shown in FIG. 1, second guide roller 21b is positioned at the opposite side (directly opposite side) of first guide roller 21a across rotation axis AX1 of hub 10.

Second guide roller 21b restricts wobbling of magnetic tape MT in the width direction, being wound overlappingly around the outer peripheral surface of tape roll MT1, while pressing the outer peripheral surface of tape roll MT1.

With the present embodiment, second guide roller 21b is arranged to press the outer peripheral surface of tape roll MT1 and the pressing force thereof (the pressing force of second guide roller 21b shall hereinafter be referred to simply as the "touching pressure") is set to 0.20 to 0.59N (20 to 60 gf) per length of 12.7 mm (0.5 inches) in the width direction of magnetic tape MT.

Also as shown in FIG. 2B, a rotation axis AX3 of second guide roller 21b is inclined so as to form the angle θ with respect to rotation axis AX1 of hub 10. The angle of rotation axis AX3 of second guide roller 21b with respect to rotation axis AX1 of hub 10 is thus matched with the taper angle of outer peripheral surface 10a of hub 10 at the position of second guide roller 21b.

Figure 4B:
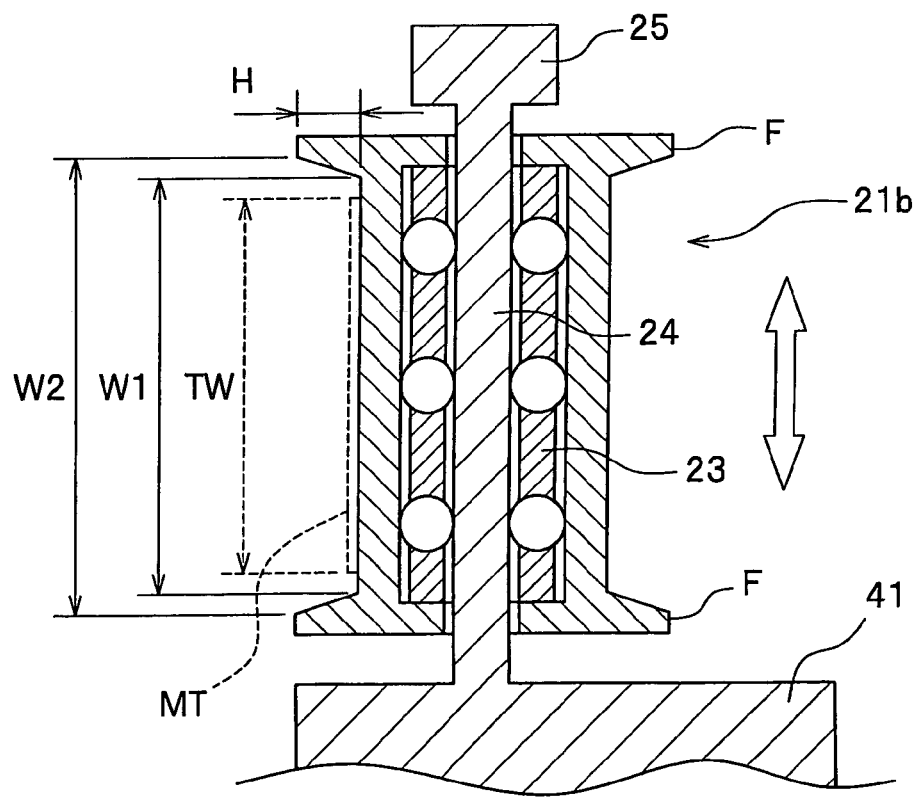
FIG. 4B is a sectional view of a second guide roller.
Figure 5:
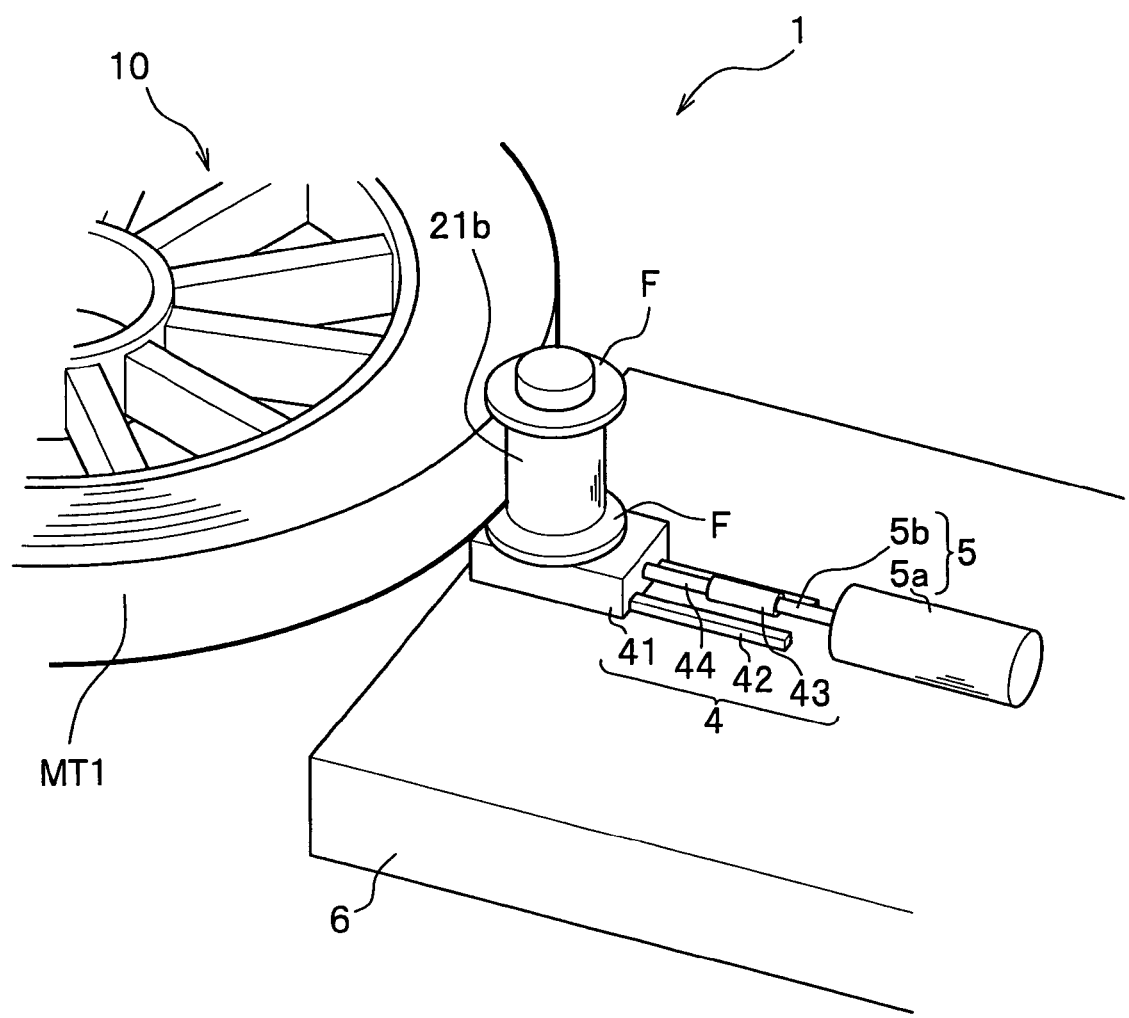
FIG. 5 is an external perspective view, as viewed from the Y direction in FIG. 1, of the state of the vicinity of the second guide roller of the tape winder of the embodiment.

As shown in FIG. 5, second guide roller 21b has a pair of flanges F formed respectively at an upper edge and a lower edge of an outer peripheral surface of its cylindrical trunk portion to restrict wobbling of magnetic tape MT in the width direction. As shown in FIG. 4B, second guide roller 21b is mounted via a linear bush 23 onto an axial member 24, disposed so as to extend upward from slider 41, and is made rotatable around axial member 24 and freely movable in the direction in which axial member 24 extends. The freely movable width of second guide roller 21b is set to no more than 1 mm and preferably no more than 0.5 mm.

In the present embodiment, first guide roller 21a and second guide roller 21b are formed of an engineering plastic, such as polyoxymethylene, or a metal, such as stainless steel or aluminum (preferably aluminum that has been anodized or chromium plated).

As shown in FIG. 1, touch roller 22 presses out air between a portion of magnetic tape MT, which has just been fed onto tape roll MT1 and the second outmost peripheral surface of tape roll MT1 and is arranged to press the outer peripheral surface of tape roll MT1, i.e., the fed magnetic tape MT. With the present embodiment, the pressing force of touch roller 22 against tape roll MT1 (the pressing force of touch roller 22 shall hereinafter be referred to simply as the "touching pressure") is set to 0.5 to 2.9 N (50 to 300 gf) per length of 12.7 mm (0.5 inches) in the width direction of magnetic tape MT.

With touch roller 22, at least the portion that contacts magnetic tape MT is formed of an elastic member, and as this elastic member, natural rubber, synthetic rubber, elastomer, etc., are available as examples, and among these, rubber of a hardness of 30 to 50 (Hs: in compliance with JIS K 6301) is preferable.

Though not illustrated, touch roller 22 is rotatably mounted on an axial member 24, disposed so as to extend upward from slider 41, in the same manner as first guide roller 21a and second guide roller 21b.

Guiding mechanisms 4 guide first guide roller 21a, second guide roller 21b, and touch roller 22 towards tape roll MT1 when first guide roller 21a, second guide roller 21b, and touch roller 22 are respectively pressed towards tape roll MT1. As shown in FIG. 3 and FIG. 5, each guide mechanism 4 has a slider 41, a guide rail 42, and a touch arm 44. Slider 41 is arranged to slide along guide rail 42, and on these sliders 41 are rotatably mounted first guide roller 21a, second guide roller 21b, and touch roller 22 as mentioned above. Guide rail 42 is mounted on a mobile supporting member 6, to be described later, so as to extend between tape roll MT1 and a linear air cylinder 5. Touch arm 44 has one end thereof mounted onto slider 41 and has the other end mounted, via a damper 43, onto a tip portion of a piston rod 5b of linear air cylinder 5 to be described below. Damper 43 is not restricted in particular as long as it is of a material that can absorb impacts and vibration, and a molded member, formed of a gel-form cushioning material, a molded member, formed of rubber of a hardness of 10 to 60 (Hs: in compliance with JIS K 6301), etc., can be cited as examples of damper 43.

Linear air cylinders 5 generate the pressing forces of first guide roller 21a, second guide roller 21b, and touch roller 22 against tape roll MT1 and are respectively attached to first guide roller 21a, second guide roller 21b, and touch roller 22 as shown in FIG. 1.

Each linear air cylinder 5 has a known structure and has a main body portion 5a and a piston rod 5b as shown in FIG. 3 and FIG. 5. With each linear air cylinder 5, piston rod 5b is made to protrude outward by air being fed into main body portion 5a from an air feed pipe (not shown). With magnetic tape winder 1 of the present embodiment, the openings of air flow control valves Va, Vb, and Vc, provided along air feed pipes Pa, Pb, and Pc that connect the respective linear air cylinders 5 with an air compressor C as shown in FIG. 1, are controlled individually by control unit 36. By individually controlling the respective flow rates of air fed into linear air cylinders 5, respectively attached to first guide roller 21a, second guide roller 21b, and touch roller 22, control unit 36 makes the abovementioned pressing forces of first guide roller 21a, second guide roller 21b, and touch roller 22 against tape roll MT1 be generated. Touch arm 44 is mounted via damper 43 onto the tip of each piston rod 5b as mentioned above.

As shown in FIG. 1, mobile supporting members 6 support first guide roller 21a, second guide roller 21b, and touch roller 22 via linear air cylinders 5. Each mobile supporting member 6 is arranged to be moved away, by means of moving mechanism 3 to be described below, from rotation axis AX1 of hub 10 as tape roll MT1 increases in diameter.

As shown in FIG. 1, moving mechanism 3 has tables 31, positioned close to hub 10, guide rails 32, which guide mobile supporting members 6 along the upper surfaces of tables 31, ball screws 33, mounted onto mobile supporting members 6, stepping motors 34, which drive ball screws 33, and an optical sensor 35, which detects a distance to the outer peripheral surface of tape roll MT1 and outputs a distance detection signal to control unit 36.

As shown in FIG. 2A, tables 31 comprise a table 31a at a side of the first guide roller 21a and a table 31b at a side of the second guide roller 21b. The upper surface of table 31a is parallel to reference surface S. The upper surface of table 31b is inclined downwards in the direction away from hub 10 and is inclined at an angle 2θ with respect to reference surface S.

As shown in FIG. 1, moving mechanism 3 is arranged so that control unit 36 inputs the distance detection signal from optical sensor 35 and adjusts the rotation speeds of stepping motors 34 in accordance with the variation amount of the distance to the outer peripheral surface of tape roll MT1 that is detected based on the distance detection signal. Moving mechanism 3 is arranged to adjust the moving speeds of mobile supporting members 6 that move away from rotation axis AX1 of hub 10 by adjusting the rotation speeds of stepping motors 34. That is, in the present embodiment, as shown in FIG. 2A first guide roller 21a is moved away, via mobile supporting member 6, from rotation axis AX1 of hub 10 horizontally with respect to reference surface S, and second guide roller 21b is moved away incliningly downwards from rotation axis AX1 of hub 10 at the angle 2θ with respect to reference surface S.

<Operations of Magnetic Tape Winder 1>

Figure 6:
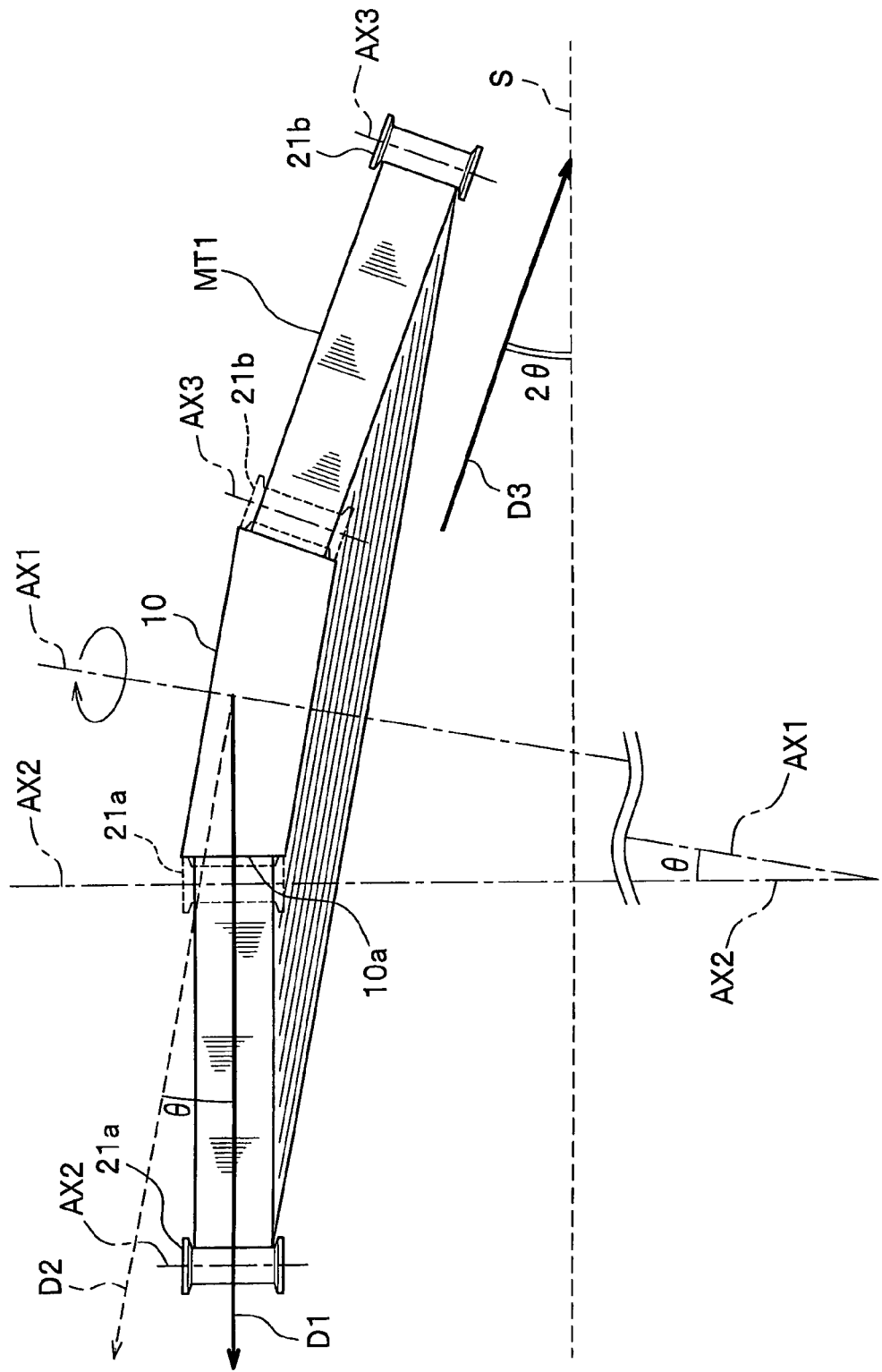
FIG. 6 is a schematic view of the manner in which a magnetic tape is wound around the hub of the tape winder of the embodiment.

The operations of magnetic tape winder 1 of the present embodiment shall now be described with reference to the drawings. Of the drawings referenced, FIG. 6 is a schematic view of the manner in which the magnetic tape is wound around the hub of the tape winder of the embodiment.

As shown in FIG. 1, with magnetic tape winder 1, when hub 10 is rotated about rotation axis AX1 by drive motor 7 (see FIG. 2A), magnetic tape MT is wound around hub 10 via crown rollers 21c, first guide roller 21a, and touch roller 22. Tape roll MT1 is thereby formed by the wound magnetic tape MT on the outer peripheral surface 10a (see FIG. 2B) of hub 10.

Meanwhile, optical sensor 35 detects the distance to the outer peripheral surface of tape roll MT1, which gradually increases in diameter, and supplies the distance detection signal to control unit 36. Control unit 36 then determines the variation amount of the distance based on the distance detection signal and adjusts the rotation speeds of stepping motors 34 in accordance with the variation amount. The rotation speeds of ball screws 33 connected to stepping motors 34 are thus adjusted in accordance with the variation amount of the distance to the outer peripheral surface of tape roll MT1 that is increasing in diameter. As a result, with this magnetic tape winder 1, mobile supporting members 6, which are connected to ball screws 33, move away from rotation axis AX1 of hub 10 as tape roll MT1 increases in diameter. Each of touch roller 22, first guide roller 21a, and second guide roller 21b, mounted on mobile supporting members 6 via linear air cylinders 5, generate uniform pressing forces across the entire circumference of tape roll MT1 while moving so as to track the outer peripheral surface of tape roll MT1 that increases in diameter.

In the case where a gradient-distribution pressing force, with which a gradient is formed in the strength of the pressing force in the width direction of magnetic tape MT, is to be generated with this magnetic tape winder 1, touch roller 22 generates the gradient-distribution pressing force that is uniform across the entire circumference of tape roll MT1 while moving so as to track the outer peripheral surface of tape roll MT1 that increases in diameter.

As a result, with magnetic tape winder 1, winding disturbance of magnetic tape MT is prevented across the entire length of magnetic tape MT (from the start of winding to the end of winding) and the falling off of tape roll MT1 from hub 10 is prevented even if magnetic tape MT that is wound around hub 10 is thin in thickness and the wound magnetic tape MT slips readily with respect to itself.

In the case where touch roller 22 generates a gradient-distribution pressing force against the outer peripheral surface of tape roll MT1, tape roll MT1 that is curved in a bowl-like form is formed. With tape roll MT1 that is curved in a bowl-like form, magnetic tape MT, provided with a winding curl such that a good winding form will be realized when magnetic tape MT is rewound around a flanged reel, can be obtained.

As shown in FIG. 6, with magnetic tape winder 1, since rotation axis AX1 of hub 10 intersects rotation axis AX2 of first guide roller 21a at the angle θ, the direction D1 in which tape roll MT1 increases in diameter at the position of first guide roller 21a is set to the angle θ with respect to the radial direction D2 of hub 10. As a result, bowl-like tape roll MT1, which rises from hub 10 at the angle θ with respect to the radial direction D2 of hub 10, is formed around hub 10.

With magnetic tape winder 1, as such a bowl-like tape roll MT1 is formed, first guide roller 21a defines the position of feeding of magnetic tape MT (see FIG. 1) onto tape roll MT1 while pressing the outer peripheral surface of tape roll MT1 and second guide roller 21b restricts wobbling in the width direction of magnetic tape MT, wound overlappingly around the outer peripheral surface of tape roll MT1, while pressing the outer peripheral surface of tape roll MT1 at the directly opposite side of first guide roller 21a. As result, with magnetic tape winder 1, winding disturbance of magnetic tape MT is prevented in tape roll MT1, and magnetic tape MT wound around hub 10, is prevented from falling off from hub 10 even if magnetic tape MT that is wound around hub 10 is thin in thickness and the wound magnetic tape MT slips readily with respect to itself.

Also with magnetic tape winder 1, since rotation axis AX1 of hub 10 intersects rotation axis AX2 of first guide roller 21a at the angle θ and outer peripheral surface 10a of hub 10 is tapered and inclined at the angle θ with respect to rotation axis AX1 of hub 10 (see FIG. 2B), the taper angle of hub 10 at the position of first guide roller 21a matches the angle of rotation axis AX2 of first guide roller 21a with respect to rotation axis AX1. As a result, first guide roller 21a is put in appropriate contact with magnetic tape MT (the outer peripheral surface of tape roll MT1) that is wound overlappingly around outer peripheral surface 10a of hub 10. Thus with magnetic tape winder 1, since first guide roller 21a presses the outer peripheral surface of tape roll MT1 uniformly and appropriately, bowl-like tape roll MT1 of better winding form is formed.

Also with magnetic tape winder 1, second guide roller 21b is positioned directly opposite to first guide roller 21a across rotation axis AX1 of hub 10. Second guide roller 21b is moved away from rotation axis AX1 of hub 10 by moving mechanism 3 (see FIG. 1) as tape roll MT1 increases in diameter. In this process, second guide roller 21b moves away from rotation axis AX1 of hub 10 in the direction of the angle 2θ with respect to reference surface S. Meanwhile, since rotation axis AX1 of hub 10 intersects rotation axis AX2 of first guide roller 21a at the angle θ, the direction D3, in which tape roll MT1 increases in diameter at the position of second guide roller 21b, forms the angle 2θ with respect to reference surface S. The direction in which second guide roller 21b is moved away form rotation axis AX1 of hub 10 thus matches the direction D3 in which tape roll MT1 increases in diameter at the position of second guide roller 21b. Second guide roller 21b restricts wobbling in the width direction of magnetic tape MT, wound overlappingly around the outer peripheral surface of tape roll MT1, while pressing the outer peripheral surface of tape roll MT1. As a result, this magnetic tape winder 1 forms bowl-like tape roll MT1 of better winding form.

Also with magnetic tape winder 1, even when for example due to dispersion of the precision of assembly of magnetic tape winder 1, there are some deviations in the relative position of second guide roller 21b with respect to first guide roller 21a among individual magnetic tape winders 1, since second guide roller 21b is freely movable in the width direction of magnetic tape MT, such deviations are absorbed. Consequently with this magnetic tape winder 1, damaging of the tape edge is reduced in comparison to an arrangement wherein second guide roller 21b is not freely movable.

Also as shown in FIG. 1, with magnetic tape winder 1, control unit 36 controls the respective openings of air flow control valves Va, Vb, and Vc and thereby individually adjusts the air flow rates fed into linear air cylinders 5 respectively attached to first guide roller 21a, second guide roller 21b, and touch roller 22. As a result, the protruding forces of piston rods 5b (see FIG. 3) of the respective linear air cylinders 5 are adjusted individually. Thus as shown in FIG. 3, with magnetic tape winder 1, touch roller 22, first guide roller 21a, and second guide roller 21b (see FIG. 1), which are mounted on sliders 41 that slide along guide rails 42, are pressed by piston rods 5b via dampers 43 and touch arms 44 and the pressing forces thereof against tape roll MT1 are adjusted individually. Thus with magnetic tape winder 1, pressing forces, with which the performance of touch roller 22, first guide roller 21a, and second guide roller 21b can be adequately exhibited individually, can be set accurately and yet easily. And with magnetic tape winder 1, for example, the pressing force of first guide roller 21a can be made fixed across the entire length (from the start of winding to the end of winding) of magnetic tape MT and the pressing force of touch roller 22 can be made to decrease successively across the entire length (from the start of winding to the end of winding) of magnetic tape MT. As a result, with magnetic tape winder 1, winding disturbance of magnetic tape MT is prevented across the entire length of magnetic tape MT (from the start of winding to the end of winding) and the falling off of tape roll MT1 from hub 10 is prevented even if magnetic tape MT that is wound around hub 10 is thin in thickness and the wound magnetic tape MT slips readily with respect to itself. Magnetic tape winder 1 thus can improve a production efficiency of magnetic tape MT and prevents edges from being damaged during storage and transport of magnetic tape MT.

As shown in FIG. 1, with magnetic tape winder 1, touch roller 22, first guide roller 21a, and second guide roller 21b are mounted via linear air cylinders 5 onto mobile supporting members 6 that move away from hub 10 as tape roll MT1 increases in diameter. Thus with magnetic tape winder 1, the mounting members (touch arms 44, etc.) for touch roller 22, first guide roller 21a, and second guide roller 21b can be made lightweight in comparison to the conventional magnetic tape winder, such as disclosed in the abovementioned Japanese Laid-open Patent Application Publication No. 2003-346454, wherein a touch roller and a first guide roller are mounted to the tip of a swinging arm and the swinging arm is rotated by an actuator, etc., as a tape roll increases in diameter. That is, with magnetic tape winder 1, the inertias during movement of touch roller 22, first guide roller 21a, and second guide roller 21b can be reduced. As a result, in comparison to the conventional magnetic tape winder, touch roller 22, first guide roller 21a, and second guide roller 21b are excellent in the property of tracking the outer peripheral surface of tape roll MT1 with magnetic tape winder 1. Thus with magnetic tape winder 1, a uniform pressing force (or a tapered pressing force) is generated across the entire circumference of tape roll MT1.

As a result, with magnetic tape winder 1, winding disturbance of magnetic tape MT is prevented across the entire length of magnetic tape MT (from the start of winding to the end of winding) and the falling off of tape roll MT1 from hub 10 is prevented even if magnetic tape MT that is wound around hub 10 is thin in thickness and the wound magnetic tape MT slips readily with respect to itself.

Also in comparison to the conventional magnetic tape winder, since touch roller 22, first guide roller 21a, and second guide roller 21b are excellent in the property of tracking the outer peripheral surface of tape roll MT1 with magnetic tape winder 1, even if some decentering or tilting of rotation axis AX1 of hub 10 occurs, these are tolerated and tape roll MT1 is made satisfactory in winding form.

Also as shown in FIG. 3, with magnetic tape winder 1, since linear air cylinders 5 push touch roller 22, first guide roller 21a, and second guide roller 21b via dampers 43, touch roller 22, first guide roller 21a, and second guide roller 21b are improved further in the property of tracking the outer peripheral surface of tape roll MT1.

Also as shown in FIG. 4, with magnetic tape winder 1, the interval W1 between inner circumferences of flanges F of each of first guide roller 21a and second guide roller 21b is set to be 5 to 15 µm greater than the width TW of magnetic tape MT. As a result, with magnetic tape winder 1, the winding form of magnetic tape MT can be made better in the case where magnetic tape MT is wound around hub 10 at a fixed speed.

With magnetic tape winder 1, the width (interval) W2 between outer circumferences of flanges F of each of first guide roller 21a and second guide roller 21b is set to be 20 to 100 µm greater than the width TW of magnetic tape MT. As a result, with magnetic tape winder 1, the winding form of magnetic tape MT under acceleration of the winding speed of magnetic tape MT can be made better.

Tape roll MT1, which is formed using such a magnetic tape winder 1, is subject to a heat treatment at a predetermined temperature to provide magnetic tape MT with a winding curl. As a result, magnetic tape MT becomes curved in shape as shown in FIG. 9A.

Though the embodiment of this invention has been described above, this invention is not limited thereto and obviously changes can be made as suited in accordance with the subject of this invention.

For example, though the above-described embodiment is arranged so that the pressing forces generated by linear air cylinders 5 are transmitted via guiding mechanisms (see FIG. 3 and FIG. 5) to touch roller 22, first guide roller 21a, and second guide roller 21b, this invention is not limited to this.

Figure 7:
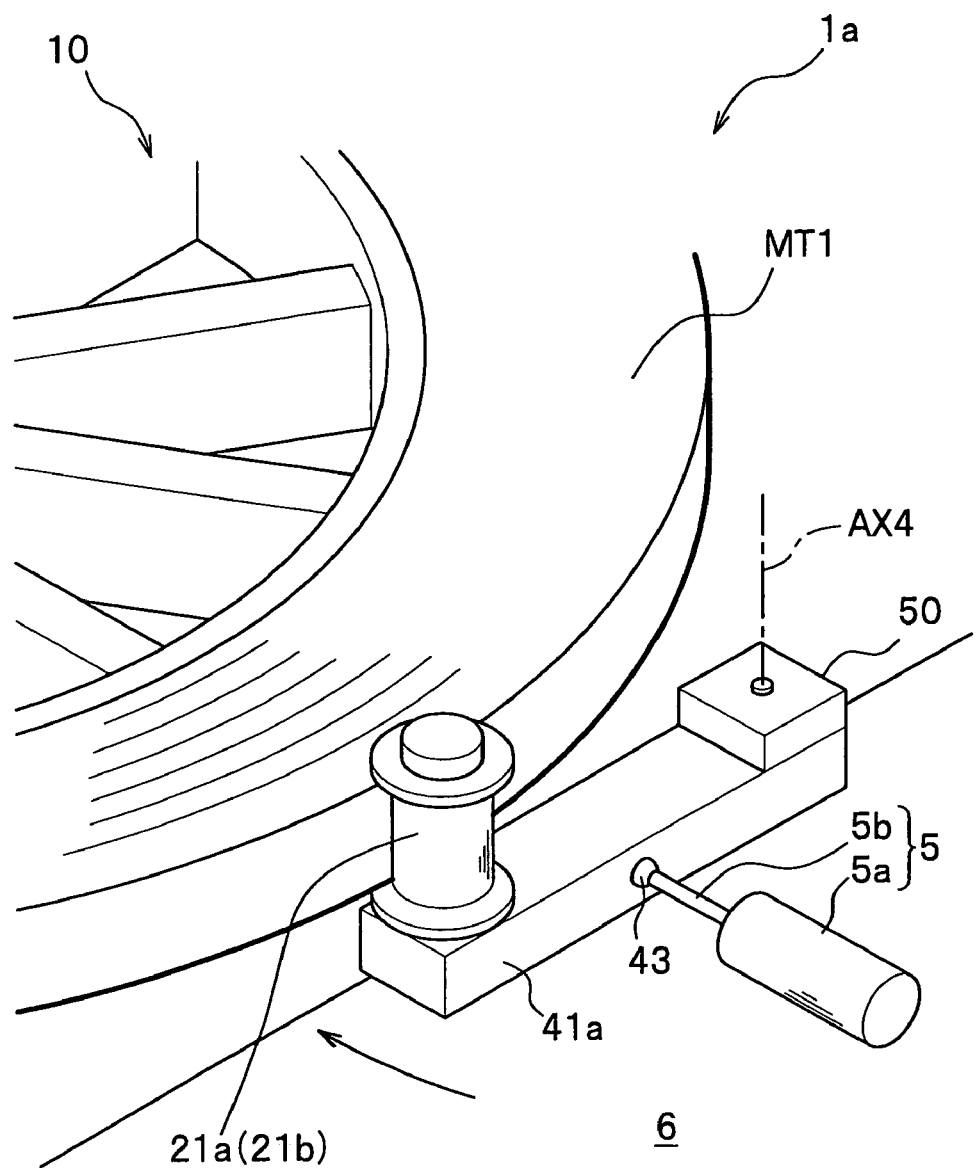
FIG. 7 is a partial perspective view of a magnetic tape winder of another embodiment.

For example, an arrangement is also possible wherein, as shown in FIG. 7, the pressing force generated by a linear air cylinder 5 is transmitted via a comparatively compact swinging arm 41a, disposed on mobile supporting member 6, to first guide roller 21a, etc. An arrangement is also possible wherein, as shown in FIG. 8, the pressing force generated by the linear air cylinder 5 is transmitted via a comparatively compact swinging arm 41a, disposed on mobile supporting member 6, to touch roller 22.

Figure 8:
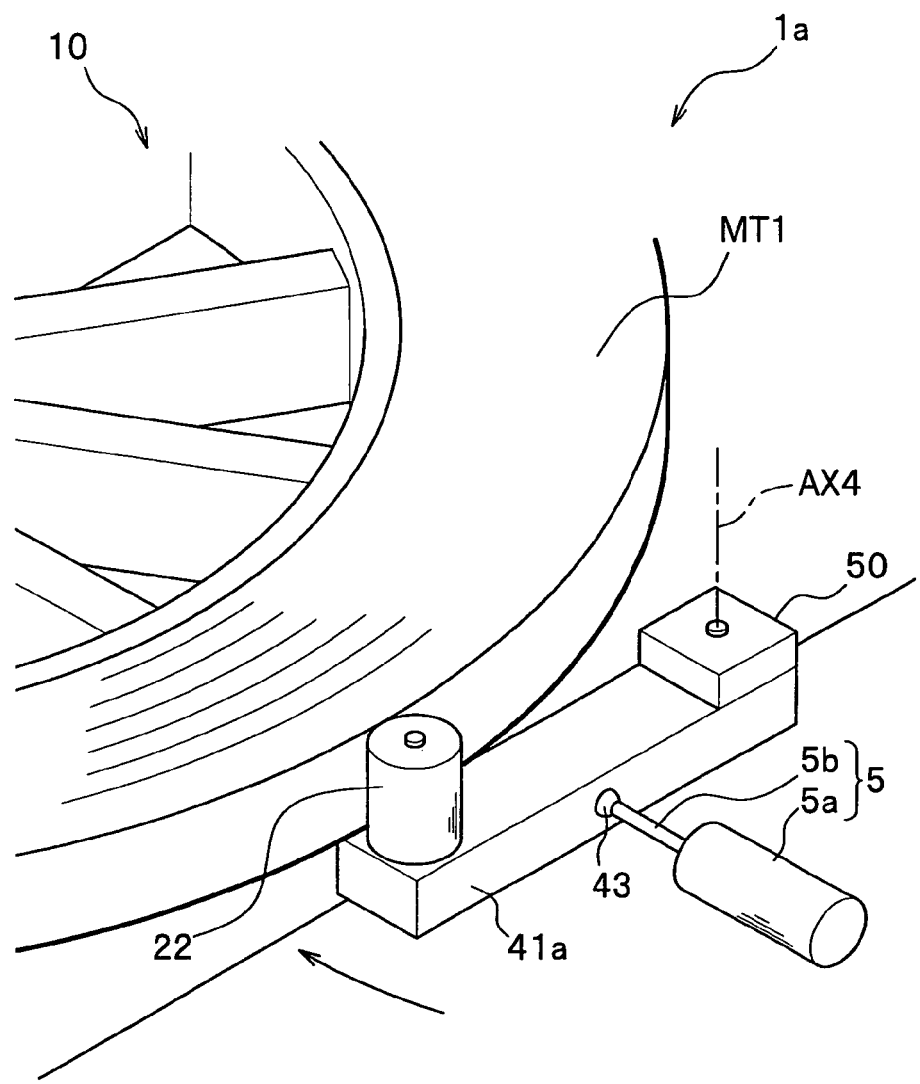
FIG. 8 is a partial perspective view of the arrangement of the magnetic tape winder of another embodiment.

Since the embodiment of FIG. 8 is the same in arrangement and operations as the embodiment of FIG. 7 except touch roller 22 is disposed in place of first guide roller 21a (second guide roller 21b), only the mechanism for transmission of pressing force to first guide roller 21a (second guide roller 21b) shown in FIG. 7 shall be described here.

As shown in FIG. 7, this swinging arm type magnetic tape winder 1a has swinging arm 41a, disposed so as to be able to swing around a swinging axis AX4 defined on mobile supporting member 6, first guide roller 21a (second guide roller 21b), rotatably mounted on a swinging end of swinging arm 41a, and linear air cylinder 5, fixed on mobile supporting member 6. A tip portion of piston rod 5b of linear air cylinder 5 is mounted via damper 43 to a substantially central portion of swinging arm 41a. An angle sensor 50, which detects the swinging angle of swinging arm 41a, is disposed about swinging axis AX4 of swinging arm 41a. This angle sensor 50 is arranged to supply an angle detection signal, resulting from detection, to control unit 36 (see FIG. 1). Control unit 36 is arranged to supply, on the basis of the input angle detection signal, a drive signal to a stepping motor 34 (see FIG. 1) for moving mobile supporting member 6 in a manner such that the swinging angle of swinging arm 41a is kept fixed.

With magnetic tape winder 1a, when piston rod 5b protrudes outward due to air being supplied to linear air cylinder 5, the swinging end of swinging arm 41a moves so as to approach tape roll MT1. Consequently, first guide roller 21a (second guide roller 21b) presses the outer peripheral surface of tape roll MT1. With magnetic tape winder 1a, since linear air cylinder 5 presses first guide roller 21a (second guide roller 21b) via damper 43, first guide roller 21a (second guide roller 21b) is improved in the property of tracking the outer peripheral surface of tape roll MT1.

Also with magnetic tape winder 1a, though the swinging angle of swinging arm 41a tends to change as tape roll MT1 increases in diameter, since control unit 36 moves mobile supporting member 6 so that the swinging angle is kept fixed, first guide roller 21a (second guide roller 21b) generates a uniform pressing force across the entire outer periphery of tape roll MT1 while moving so as to track the outer peripheral surface of tape roll MT1 that gradually increases in diameter. With magnetic tape winder 1a, optical sensor 35, shown in FIG. 1, may be omitted.

Also, though in the above-described embodiment, by rotation axis AX3 of second guide roller 21b being inclined so as to form the angle θ with respect to the rotation axis AX1 of hub 10, the angle of rotation axis AX3 is matched with the taper angle of outer peripheral surface 10a of hub 10 at the position of second guide roller 21b (see FIG. 2B), this invention is not limited thereto, and the angle of rotation axis AX3 may be set close to the taper angle of outer peripheral surface 10a of hub 10. Also, though with the above-described embodiment, second guide roller 21b is described as having a cylindrical trunk portion, this invention is not limited thereto and second guide roller 21b having a trunk portion with a tapered outer peripheral surface may be equipped instead.

Figure 9:
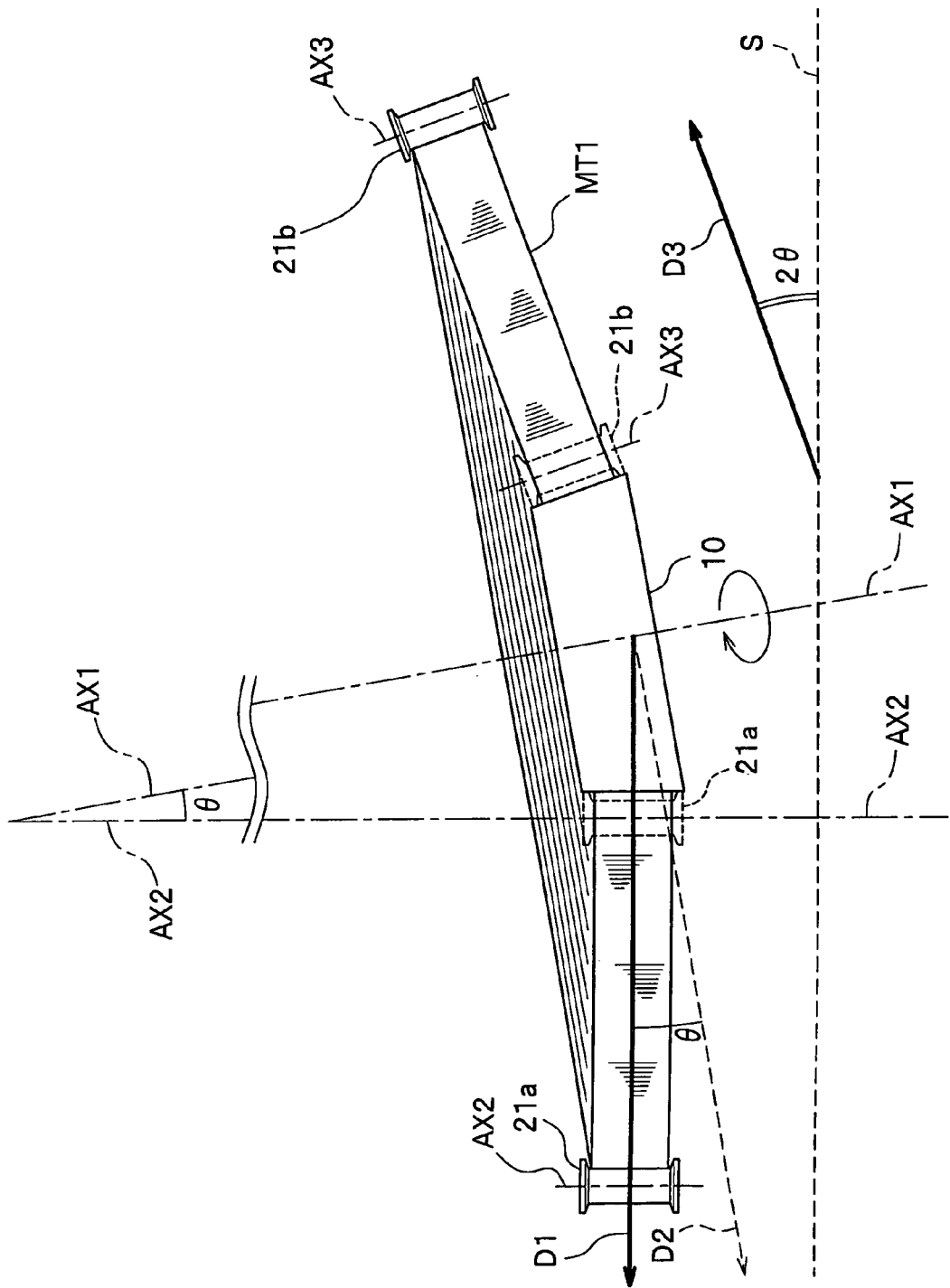
FIG. 9 is a schematic view of the manner in which a magnetic tape is wound around a hub of the tape winder of another embodiment.

Also, though with the above-described embodiment, second guide roller 21b is arranged to move away from rotation axis AX1 of hub 10 in an incliningly downward direction of the angle 2θ with respect to reference surface S (see FIG. 6), this invention is not restricted thereto, and for example, second guide roller 21b may be arranged to move away from rotation axis AX1 of hub 10 in an incliningly upward direction of the angle 2θ with respect to reference surface S as shown in FIG. 9. Hub 10 of this magnetic tape winder preferably has its taper formed in the opposite direction of that of hub 10 of magnetic tape winder 1. Also, the angle of rotation axis AX3 of second guide roller 21b of this magnetic tape winder is preferably equal to the taper angle of hub 10 at the position of second guide roller 21b.

Also, though with the above-described embodiment, magnetic tape winder 1 using hub 10 with tapered outer peripheral surface 10a was described (see FIG. 6), this invention is not restricted thereto and a cylindrical hub 10 may be used instead. Also, though with the above-described embodiment, the taper angle of outer peripheral surface 10a (see FIG. 2B) of hub 10 was arranged to be matched to the angle θ of rotation axis AX1 of hub 10 with respect to rotation axis AX2 of first guide roller 21a, this invention is not restricted thereto and the taper angle of outer peripheral surface 10a of hub 10 may be set close to the angle θ. With a tape winder equipped with a cylindrical hub 10, since rotation axis AX1 of hub 10 intersects rotation axis AX2 of first guide roller 21a at the angle θ, a gradient-distribution pressing force, with which a gradient of the strength of the pressing force is formed in the width direction of magnetic tape MT, is generated on hub 10. A bowl-like tape roll MT1 can thus be formed by this magnetic tape winder.

Also, though with the above-described embodiment, second guide roller 21b is mounted via linear bush 23 to axial member 24 (see FIG. 4B), this invention is not restricted thereto and an air guide may be formed between second guide roller 21b and axial member 24. Also, cushioning members, for positioning second guide roller 21b at substantially the center of axial member 24, may be disposed respectively at the interval between slider 41 and second guide roller 21b and the interval between second guide roller 21b and detachment preventing member 25. Springs, rubber of a hardness of 10 to 20 (Hs: in compliance with JIS K 6301), etc., can be cited as examples of the cushioning members.

Also, though in the above-described embodiment, magnetic tape winder 1 in which one each of first guide roller 21a, second guide roller 21b, and touch roller 22 are disposed was described (see FIG. 1), this invention is not restricted thereto and the numbers and positions of first guide roller 21a, second guide roller 21b, and touch roller 22 may be arbitrary.

Also, though stepping motors 34, which drive ball screws 33, are used as mechanisms (moving mechanisms 3) for moving mobile supporting member 6, this invention is not restricted thereto and AC (alternating current) or DC (direct current) servo motors may be used in place of stepping motors 34. Also, moving mechanisms 3 are not restricted in particular as long as they are mechanisms that convert the rotating motions of, for example, stepping motors 3 to rectilinear motions and move mobile supporting member 6, and this invention's moving mechanisms 3 may be arranged with pulleys mounted to the rotation axes of stepping motors 34, etc., and belts that transmit the rotation forces of the pulleys.

Also, though with the above-described embodiment, an example of applying the present invention to magnetic tape winder 1 was described, this invention is not restricted thereto and may be applied to an arrangement for winding tape besides magnetic tape MT.

EXAMPLES

Examples by which the effects of this invention's tape winder (magnetic tape winder) were confirmed shall now be described.

Examples 1 to 6

With each of Examples 1 to 6, hub 10, with which rotation axis AX1 is inclined with respect to rotation axis AX2 of first guide roller 21a at the axial angle θ (°), shown in Table 1 given below, was used in magnetic tape winder 1 of the above-described embodiment (see FIG. 1) and magnetic tape MT of a total length of 5000 m was wound around hub 10 (winding tension: 0.981 N (100 gf)).

Here, the pressing force (referred to hereinafter as the "touching pressure") of touch roller 22 was set to 1.96 N/12.7 mm (200 gf/0.5 inches), the touching pressure of first guide roller 21a was set to 1.18 N/12.7 mm (120 gf/0.5 inches), and the touching pressure of second guide roller 21b was set to 0.29N/12.7 mm (30 gf/0.5 inches). With each of Examples 1 to 6, the traveling speed (winding speed) of magnetic tape MT was set to the value shown in Table 1. The winding acceleration of magnetic tape MT until attainment of the traveling speed shown in Table 1 was set to 1 m/s².

The winding form of tape roll MT1 obtained with each of Examples 1 to 6 was then evaluated. The results are shown in Table 1. In Table 1, ○ indicates that the winding form of tape roll MT1 was good, and Δ indicates that the winding form of tape roll MT1 was fairly good.

Comparative Examples 1 to 4

In each of Comparative Examples 1 to 4, an arrangement, except having no second guide roller 21b, is the same as magnetic tape winding device 1 of the above-described embodiment (see FIG. 1), was used with hub 10, in which rotation axis AX1 is inclined with respect to rotation axis AX2 of first guide roller 21a at the axial angle θ (°), shown in Table 1 given below, and thus magnetic tape MT of a total length of 5000 m was wound around hub 10 (winding tension: 0.981 N (100 gf)).

With each of Comparative Examples 1 to 4, the traveling speed (winding speed) of magnetic tape MT was set to the value shown in Table 1. The winding acceleration of magnetic tape MT until attainment of the traveling speed shown in Table 1 was set to 1 m/s². The winding form of tape roll MT1 obtained with each of Comparative Examples 1 to 4 was then evaluated. The results are shown in Table 1. In Table 1, x indicates that the winding form of tape roll MT1 was poor. Irrespective of the presence or the absence of second guide roller 21*b*, Comparative Example 1 corresponds to Example 2, Comparative Example 2 corresponds to Example 3, Comparative Example 3 corresponds to Example 5, and Comparative Example 4 corresponds to Example 6.

TABLE 1

| | Presence of second guide roller | Axial angle θ (°) | Magnetic tape traveling speed (m/s) | Evaluation of winding form |
|---|---|---|---|---|
| Example 1 | Yes | 0.3 | 5 | ○ |
| Example 2 | Yes | 0.3 | 10 | ○ |
| Example 3 | Yes | 0.3 | 15 | ○ |
| Example 4 | Yes | 0.6 | 5 | ○ |
| Example 5 | Yes | 0.6 | 10 | ○ |
| Example 6 | Yes | 0.6 | 15 | Δ |
| Comparative Example 1 | No | 0.3 | 10 | x |
| Comparative Example 2 | No | 0.3 | 15 | x |
| Comparative Example 3 | No | 0.6 | 10 | x |
| Comparative Example 4 | No | 0.6 | 15 | x |

(Evaluation of Winding Form of Tape Roll)

As is clear from Table 1, tape rolls MT1 obtained with Examples 1 to 5 were all good in winding form, and tape roll MT1 obtained from Example 6 was fairly good in winding form. Since the winding forms of tape rolls MT1 obtained with Comparative Examples 1 to 4 were poor, it is considered that the winding forms of tape rolls MT1 obtained with Examples 1 to 6 were good due to the provision of second guide roller 21*b*.

Examples 7 to 9

In each of Examples 7 to 9, hub 10 of which rotation axis AX1 is inclined at 0.6° with respect to rotation axis AX2 of first guide roller 21*a* was used in magnetic tape winder 1 of the above-described embodiment (see FIG. 1), and magnetic tape MT of a total length of 5000 m was wound around hub 10 (winding tension: 0.981N (100 gf)). With each of these magnetic tape winders 1, second guide roller 21*b* is made freely movable in the direction of its rotation axis AX3.

Here, the pressing force (referred to hereinafter as the "touching pressure") of touch roller 22 in the process of winding magnetic tape MT around hub 10 was set to 1.96 N/12.7 mm (200 gf/0.5 inches), the touching pressure of first guide roller 21*a* was set to 1.18 N/12.7 mm (120 gf/0.5 inches), and the touching pressure of second guide roller 21*b* was set to 0.29 N/12.7 mm (30 gf/0.5 inches). With each of Examples 7 to 9, the traveling speed (winding speed) of magnetic tape MT was set to the value shown in Table 2. The winding acceleration of magnetic tape MT until attainment of the traveling speed shown in Table 2 was set to 1 m/s².

The edge damage of tape roll MT1 obtained with each of Examples 7 to 9 was then evaluated. The results are shown in Table 2. In the edge damage evaluation in Table 2, ○ indicates that the edge damage was not observed, and Δ indicates that edge damage was observed partially.

TABLE 2

| | Free movement of second guide roller | Axial angle θ (°) | Magnetic tape traveling speed (m/s) | Evaluation of edge damage |
|---|---|---|---|---|
| Example 7 | Yes | 0.6 | 5 | ○ |
| Example 8 | Yes | 0.6 | 10 | ○ |
| Example 9 | Yes | 0.6 | 15 | Δ |
| Example 10 | No | 0.6 | 5 | ○ |
| Example 11 | No | 0.6 | 10 | x |
| Example 12 | No | 0.6 | 15 | x |

Examples 10 to 12

In each of Examples 10 to 12, with the exception of not making second guide roller 21*b* freely movable in the rotation axis AX3 direction, tape roll MT1 was obtained in the same manner as Examples 7 to 9. The edge damage of tape roll MT1 obtained with each of Examples 10 to 12 was then evaluated. The results are shown in Table 2. In the edge damage evaluation in Table 2, ○ indicates that the edge damage was not observed and x indicates that edge damage was observed across the entirety.

(Evaluation of Edge Damage of Tape Roll)

In Examples 7 and 8, with each of which second guide roller 21*b* was made freely movable in the direction of its rotation axis AX3, edge damage of tape roll MT1 was not observed, and in Example 9, edge damage was seen only partially on tape roll MT1. Though with Example 10, in which second guide roller 21*b* was not made freely movable in the direction of its rotation axis AX3, edge damage of tape roll MT1 was not observed, with each of Examples 11 and 12, in which the traveling speed of magnetic tape MT was high in comparison to Example 10, edge damage of tape roll MT1 was observed across its entirety. It is thus considered that with magnetic tape winder 1, in which second guide roller 21*b* is made freely movable in the direction of its rotation axis AX3, edge damage in the process of winding magnetic tape MT at high speed is prevented.

Further examples, in which the effects of this invention's tape winder (magnetic tape winder) were confirmed, shall now be described.

Example 13

Figure 10:
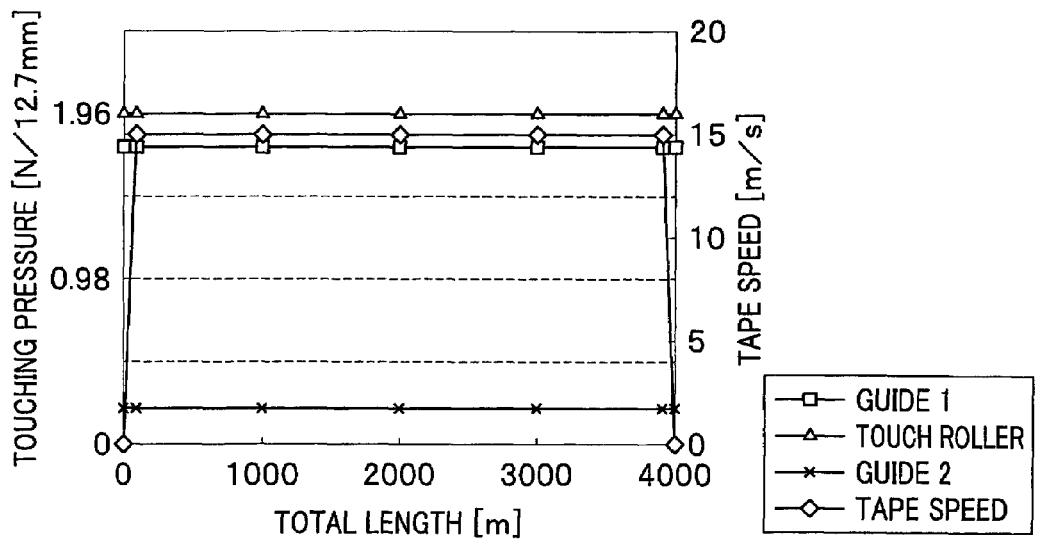
FIG. 10 is a graph of the operation of an Example 1 of the tape winder of the embodiment depicting the relationship of the touching pressure (N/12.7 mm) of the touch roller, the touching pressure (N/12.7 mm) of the first guide roller, the touching pressure (N/12.7 mm) of the second guide roller, and the magnetic tape feeding speed (m/s) with respect to the magnetic tape travel length (m)

As shown in FIG. 10, with Example 13, the touching pressure of touch roller 22 in magnetic tape winder 1 of the above-described embodiment was set to 1.96 N/12.7 mm (200 gf/0.5 inches), the touching pressure of first guide roller 21*a* (indicated as "Guide 1" in FIG. 10) was set to 1.18 N/12.7 mm (120 gf/0.5 inches), the touching pressure of second guide roller 21*b* (indicated as "Guide 2" in FIG. 10) was set to 0.39N/12.7 mm (40 gf/0.5 inches), the traveling speed (indicated as "Tape speed" in FIG. 10) of magnetic tape MT was set to 10 m/s, and magnetic tape MT of a total length of 4000 m was wound around hub 10. The abovementioned touching pressure of first guide roller 21*a* is set to be 0.2 N greater than the tape tension.

As a result, there was no winding disturbance of tape roll MT1 and tape roll MT1 exhibited a good winding form.

Example 14

Figure 11:
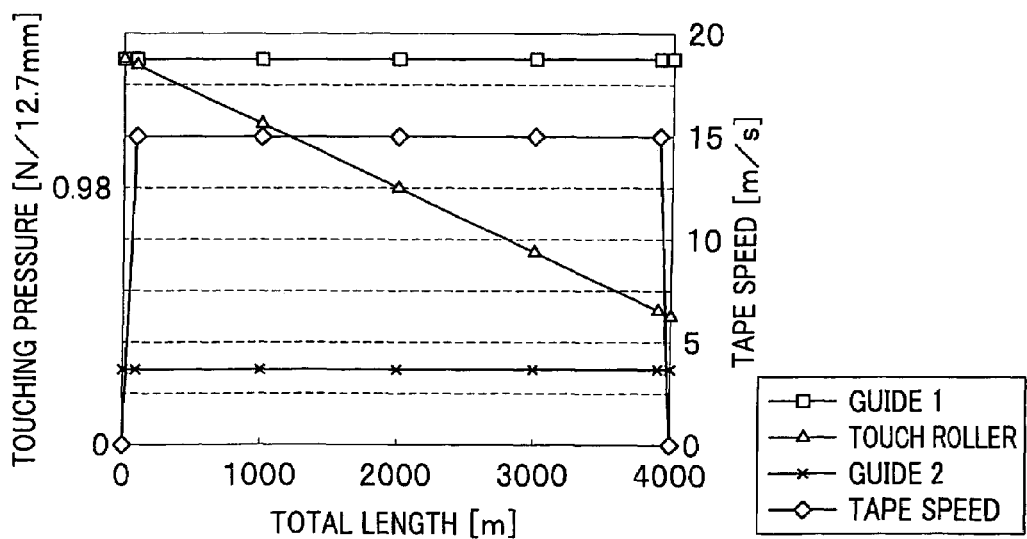
FIG. 11 is a graph of the operation of an Example 2 of the tape winder of the embodiment depicting the relationship of the touching pressure (N/12.7 mm) of the touch roller, the touching pressure (N/12.7 mm) of the first guide roller, the touching pressure (N/12.7 mm) of the second guide roller, and the magnetic tape feeding speed (m/s) with respect to the magnetic tape travel length (m)

As shown in FIG. 11, with Example 14, the touching pressure of touch roller 22 in magnetic tape winder 1 of the above-described embodiment was set to 1.47N/12.7 mm (150 gf/0.5 inches) at the start of winding of magnetic tape MT and the touching pressure was set to decrease at a fixed rate of decrease until the end of winding of magnetic tape MT. The touching pressure of touch roller 22 at the end of winding of magnetic tape MT was 0.49N/12.7 mm (50 gf/0.5 inches).

The touching pressure of first guide roller 21a (indicated as "Guide 1" in FIG. 11) was set to 1.18 N/12.7 mm (120 gf/0.5 inches), the touching pressure of second guide roller 21b (indicated as "Guide 2" in FIG. 11) was set to 0.39 N/12.7 mm (40 gf/0.5 inches), the feeding speed (indicated as "Tape speed" in FIG. 11) of magnetic tape MT was set to 10 m/s, and magnetic tape MT of a total length of 4000 m was wound around hub 10. The abovementioned touching pressure of first guide roller 21a is set to be 0.2 N greater than the tape tension.

As a result, there was no winding disturbance of tape roll MT1 and tape roll MT1 exhibited a good winding form.

Examples 15 to 19

With Examples 15 to 19, the interval W1 between inner circumferences of flanges F of first guide roller 21a shown in FIG. 4A was varied as shown in Table 3, and the winding forms of respective tape rolls MT1 that were obtained were evaluated. The flange inner circumference interval (μm) in Table 3 are indicated as relative values with respect to the width of magnetic tape MT used, and interval W1 between inner circumferences of flanges F is obtained by adding the numerical value in Table 3 to the width TW of magnetic tape MT (see FIG. 4A). The flange outer circumference interval (μm) is set 50 μm greater than the width TW of magnetic tape MT (see FIG. 4A). The "Winding form at constant speed" in Table 3 indicates the condition of the winding form of tape roll MT1 obtained by winding magnetic tape MT at 10 m/s. The "Winding form under acceleration" in Table 3 indicates the condition of the winding form of tape roll MT1 obtained by winding magnetic tape MT while accelerating the winding speed at a rate of 1 m/s². In Table 3, ○ indicates a good winding form and Δ indicates a fairly good winding form.

As is clear from Table 3, with magnetic tape winder 1, in which the interval W1 between inner circumferences of flanges F is set 5 to 15 μm greater than the width TW of magnetic tape MT, the winding form of magnetic tape MT can be made better when winding around hub 10 at constant speed is performed. With magnetic tape winder 1, in which the interval W1 between inner circumferences of flanges F is set to fall outside the abovementioned range of 5 to 15 μm (see Examples 15 and 19), the winding form of magnetic tape MT at constant speed was "fairly good." Meanwhile, with magnetic tape winder 1 of each of Examples 15 to 19, magnetic tape MT can be made satisfactory in winding form under acceleration of the winding speed of magnetic tape MT.

TABLE 3

|  | Example 15 | Example 16 | Example 17 | Example 18 | Example 19 |
| --- | --- | --- | --- | --- | --- |
| Flange inner circumference interval [μm] | +3 | +5 | +10 | +15 | +20 |

TABLE 3-continued

|  | Example 15 | Example 16 | Example 17 | Example 18 | Example 19 |
| --- | --- | --- | --- | --- | --- |
| Winding form at constant speed | Δ | ○ | ○ | ○ | Δ |
| Winding form under acceleration | ○ | ○ | ○ | ○ | ○ |

Examples 20 to 24

With Examples 20 to 24, the interval W2 between outer circumferences of flanges F of first guide roller 21a shown in FIG. 4A was varied as shown in Table 4, to be described latter, and the winding forms of respective tape rolls MT1 that were obtained were evaluated. The flange outer circumference intervals (μm) in Table 4 are indicated as relative values with respect to the width of magnetic tape MT used, and interval W2 between outer circumferences of flanges F is obtained by adding the numerical value in Table 4 to the width TW of magnetic tape MT (see FIG. 4A). The flange inner circumference interval (μm) is set 10 μm greater than the width TW of magnetic tape MT (see FIG. 4A). The "Winding form at constant speed" in Table 4 indicates the condition of the winding form of tape roll MT1 obtained by winding magnetic tape MT at 10 m/s. The "Winding form under acceleration" in Table 4 indicates the condition of the winding form of tape roll MT1 obtained by winding magnetic tape MT while accelerating the winding speed at a rate of 1 m per second. In Table 4, ○ indicates a good winding form, and Δ indicates a fairly good winding form.

As is clear from Table 4, with magnetic tape winder 1, in which the interval W2 between outer circumferences of flanges F is set 20 to 100 μm greater than the width TW of magnetic tape MT, the winding form of magnetic tape MT under acceleration of the winding speed of magnetic tape MT can be made better. With magnetic tape winder 1, in which the interval W2 between outer circumferences of flanges F is set to fall outside the abovementioned range of 20 to 100 μm (see Examples 20 and 24), the winding form of magnetic tape MT at constant speed was "fairly good." Meanwhile, with magnetic tape winder 1 of each of Examples 20 to 24, magnetic tape MT can be made satisfactory in winding form when magnetic tape MT is wound at a constant winding speed.

TABLE 4

|  | Example 20 | Example 21 | Example 22 | Example 23 | Example 24 |
| --- | --- | --- | --- | --- | --- |
| Flange inner circumference interval [μm] | +10 | +20 | +50 | +100 | +200 |
| Winding form at constant speed | ○ | ○ | ○ | ○ | ○ |
| Winding form under acceleration | Δ | ○ | ○ | ○ | Δ |

As is clear from the above Tables 3 and 4, with magnetic tape winder 1, the interval W2 between outer circumferences of flanges F is preferably set in the abovementioned range of 20 to 100 μm (value added to width TW of magnetic tape MT)

in order to make good the winding form of magnetic tape MT under acceleration, and the interval W1 between inner circumferences of flanges F is preferably set in the abovementioned range of 5 to 15 μm (value added to width TW of magnetic tape MT) in order to make good the winding form of magnetic tape MT under constant speed.

Example 25 and Comparative Example 5

In the magnetic tape winder (see magnetic tape winder 1 of FIG. 1) and a conventional magnetic tape winder (for example, the device described in Japanese Laid-open Patent Application Publication No. Sho 62-31645), the rotation axis of the hub was arbitrarily decentered by the axis decentering amounts shown in Table 5 or the rotation axis was arbitrarily inclined by the axis inclination amounts shown in Table 5. Then, the winding form and the edge damage of tape rolls obtained by winding magnetic tapes with these magnetic tape winders were evaluated. With the winding form evaluation in Table 5, ○ indicates a good winding form, Δ indicates a fairly good winding form, and x indicates a poor winding form. With the edge damage evaluation in Table 5, ○ indicates that edge damage was not observed, Δ indicates that edge damage was observed partially, and x indicates that edge damage was observed across the entirety.

TABLE 5

| | | Axis decentering amount | | Axis inclination amount | |
|---|---|---|---|---|---|
| | | 50 μm | 200 μm | 0.4° | 0.8° |
| Example 25 | Winding form | ○ | ○ | ○ | ○ |
| | Edge damage | ○ | ○ | ○ | ○ |
| Comparative Example 5 | Winding form | ○ | Δ | ○ | x |
| | Edge damage | ○ | x | Δ | x |

As is clear from Table 5, in comparison to the conventional magnetic tape winder, even if some decentering or inclination of rotation axis AX1 of hub 10 occurs, these are tolerated and tape roll MT1 can be made satisfactory in winding form with this invention's magnetic tape winder (magnetic tape winder 1).

<<Tape Processing Method>>

This tape processing method shall now be described with reference to the drawings.

<<First Mode>>

A first mode of the tape processing method shall be described with reference to FIG. 12 to FIG. 16.

In order to make the description clear, an "upper side," "lower side," "left side," "right side," "front side," and "backside" shall be set with hub 111 at the center as shown in FIG. 12.

The "upper side" is also referred to as "one side"; the "right side", "entry position side"; and the "backside", "side of the direction of progress of the tape immediately prior to entering the wound roll."

Figure 13A:
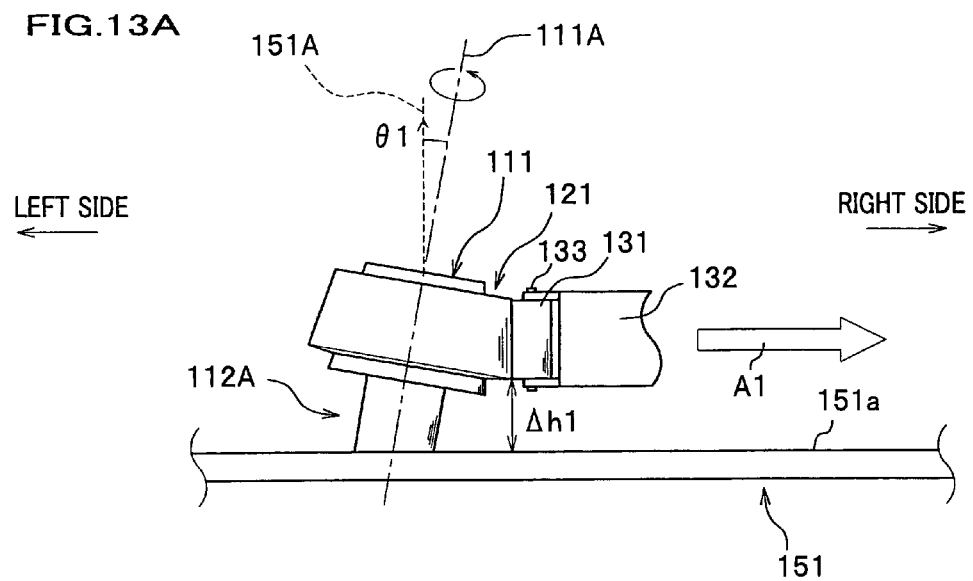
Figure 13B:
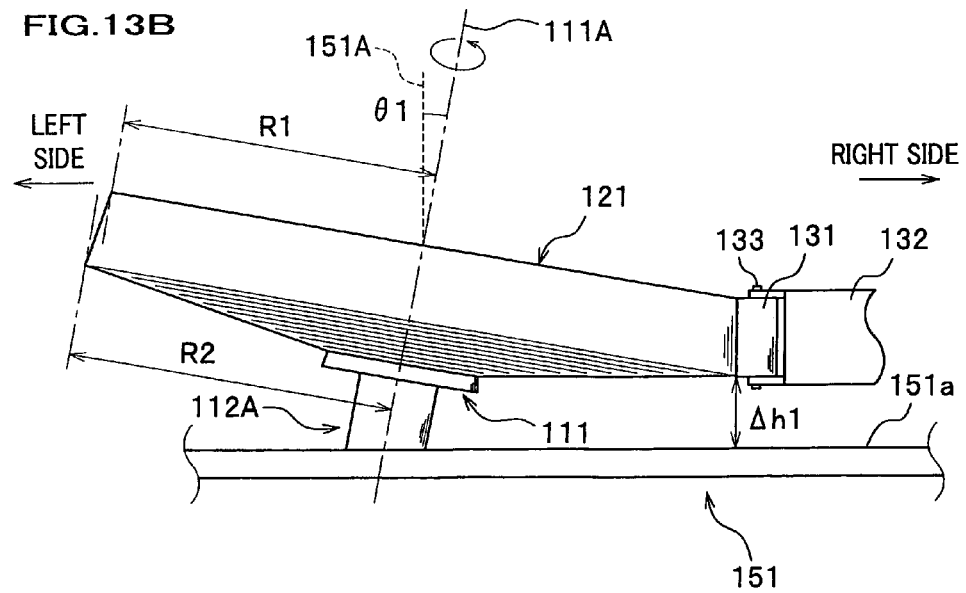

Furthermore, in FIG. 13A and FIG. 13B, a magnetic tape 100 and a guide roller 113 at the front side of a wound roll 121 are omitted.

<Arrangement of the Tape Processing Method>

The tape processing method of the first embodiment includes: a first step of pressing the outermost peripheral surface of wound roll 121 by a touch roller 131 at the position (winding position) at which magnetic tape 100 enters (is wound on) wound roll 121 while the hub 111 is rotated to wind magnetic tape 100; and a second step of heat-treating wound roll 121 within a predetermined temperature range directly below the glass transition temperature of a base film.

<First Step>

The first step of winding magnetic tape 100 onto wound roll 121 shall now be described.

<Magnetic Tape>

First, magnetic tape 100, which is a target of treatment (winding treatment and heat treatment), shall be described.

In general, magnetic tape 100 has an overall thickness of no more than 10 μm and has a nonmagnetic base film (supporting member) and a magnetic layer formed on the base film. The magnetic layer generally has a thickness of no more than 0.5 μm and is formed by coating a magnetic coat, prepared by mixing a magnetic powder, binding agent, organic solvent, etc., until the magnetic powder is dispersed uniformly, on the surface of the base film. Or, the magnetic layer is formed by depositing a metal, alloy, or other ferromagnetic material onto the surface of the base film by vacuum vapor deposition, sputtering, or other method.

As the magnetic powder, for example, ferromagnetic iron oxide based particles of $\alpha$-$Fe_2O_3$, $Fe_3O_4$, cobalt-coated $\alpha$-$Fe_2O_3$, etc., ferromagnetic chromium dioxide based particles, ferromagnetic metal based particles formed of a metal, such as Fe, Co, Ni, etc., or an alloy containing these metals, hexagonal ferrite microparticles of hexagonal plate-like form, etc., may be used upon selection as suited.

As the binding agent, a polymer of urethane, vinyl chloride, vinyl acetate, vinyl alcohol, vinylidene chloride, acrylic acid ester, styrene, butadiene, acrylonitrile, etc., a copolymer combining two or more of the above compounds, a polyester resin, or an epoxy resin, etc., may be used.

As the organic solvent, an ether, ester, ketone, aromatic hydrocarbon, aliphatic hydrocarbon, chlorinated hydrocarbon, etc., may be used.

Examples of materials that can be used as the material of the base film include polyesters, such as polyethylene terephthalate (PET) and polyethylene naphthalate (PEN), polyolefins, such as polypropylene, cellulose derivatives, such as nitrocellulose, polyamides, polyvinyl chlorides, polycarbonates, aramids, and other polymers.

Among the above, polyesters are low in cost and are excellent in processability and mechanical characteristics. Polyethylene naphthalate (PEN) excels over polyethylene terephthalate (PET) in strength, rigidity, and heat resistance. An aramid is preferably added in cases where heat resistance is considered.

[Hub]

Hub 111 shall now be described briefly.

As hub 111, the arrangement shown in FIG. 12, with which a taper that becomes smaller in diameter at the upper side (one side) is formed on the outer peripheral surface (tapered surface), is used. The degree of tapering is determined based on the width of magnetic tape 100 and the curvature to be provided to magnetic tape 100. For example, when a ¼-inch magnetic tape 100 is to be wound and the height of hub 111 is 18 mm, hub 111, with which the upper side is smaller in diameter at the outer circumference ratio shown in the following Table 6, is preferably used.

TABLE 6

| Curvature (mm/m) | 0.5 | 1 | 2 | 4 |
|---|---|---|---|---|
| Outer circumference ratio of the hub | 1.00007 | 1.0001 | 1.0003 | 1.0006 |

Hub 111 has a hub hole 111a formed along its axis and on the inner circumferential surface of hub 111a is formed inner teeth (not shown) that engage with a spindle 112A that rotates hub 111.

Such a hub 111 is mounted onto spindle 112A, which protrudes from a panel 151 of the tape winder (partially shown). Spindle 112A is inclined towards the side (right side) of an entry position at which magnetic tape 100 enters (is wound on) wound roll 121 (see FIG. 13A). To be more detailed, the rotation axis (referred to hereinafter as "hub rotation axis 111A") of hub 111 mounted on spindle 112A is inclined at an inclination angle θ1 (for example 0.8°) towards the side of the entry position at which magnetic tape 100 enters wound roll 121. Put in another way, hub rotation axis 111A is inclined towards the entry position side at the inclination angle θ1 with respect to a normal (referred to hereinafter as "panel normal 151A") to an upper surface (referred to hereinafter as "panel surface 151a") of panel 151. In the first embodiment, panel surface 151a corresponds to a "reference plane." However, the reference plane does not always correspond to the panel surface 151a.

Panel surface 151a is perpendicular to a traveling plane 100a of magnetic tape 100 immediately prior to entering wound roll 121, and magnetic tape 100 travels towards wound roll 121 while being spaced apart from panel surface 151a by a predetermined interval. This predetermined interval matches the height Δh1 of touch roller 131 to be described below.

Further put in another way, hub rotation axis 111A is inclined towards the entry position side at the inclination angle θ1 with respect to a width direction 100b of the traveling tape 100.

<Winding of the Magnetic Tape>

With hub 111 being thus mounted on spindle 112A, magnetic tape 100 is passed via guide roller 113 at the upstream side of hub 111 and then one end of magnetic tape 100 is fixed by a suitable mechanism onto the outer peripheral surface of hub 111. Spindle 112A is then rotated at a predetermined rotation speed, and magnetic tape 100 is wound around the outer peripheral surface of hub 111 and thereby made into wound roll 121. While magnetic tape 100 is wound, the outermost peripheral surface of wound roll 121, formed by the winding of magnetic tape 100, is pressed by touch roller 131 at the entry position of magnetic tape 100 into wound roll 121.

[Touch Roller]

Touch roller 131, etc., shall now be described briefly.

Touch roller 131 is rotatably supported on a touch arm 132 via a rotation axis member 133. Touch roller 131 is formed of an elastic material with a predetermined elasticity. Thus even if the outer peripheral surface of wound roll 121 (referred to hereinafter as the "wound roll outer peripheral surface") becomes decentered due to the rotation of wound roll 121, touch roller 131 follows and restrains the behavior of magnetic tape 100 in the width direction and radial direction. Rubber-based materials, such as urethane rubber, can be given as examples of such an elastic material.

A touch roller 135 (may also be referred to hereinafter as "flange roller") having flanges 135b may be used in place of touch roller 131.

Also, another touch roller 131 and touch roller 135 (may also be referred to hereinafter as "flange roller"; see FIGS. 19A and 19B) to be described below may be used in combination in addition to touch roller 131. In this case, the outermost peripheral surface of wound roll 121 at the downstream side of the abovementioned entry position may be arranged to be pressed by the other touch roller 131 and touch roller 135. That is, for example, the outermost peripheral surface of wound roll 121 may be pressed from the backside by the other touch roller 131 and from the left side by touch roller 135. In such a case where the outermost peripheral surface of wound roll 121 is pressed by a plurality of rollers, magnetic tape 100 is more readily wound in accordance with (along) the outer peripheral surface (tapered surface) of hub 111.

Touch arm 132 is movable outward in the radial direction of hub 111 by a touch arm moving mechanism (not shown). Touch roller 131 is thus movable outward (to the right) in the radial direction of hub 111 by the touch arm moving mechanism (not shown) while being kept at the predetermined height Δh1 with respect to panel surface 151a (see arrow A1 in FIG. 13A).

[Guide Roller]

Guide roller 113 shall now be described briefly. Guide roller 113 guides magnetic tape 100, and a known guide roller with flanges may be selected as this guiding guide roller.

Thus, magnetic tape 100 is continued to be wound with the entry position being pressed by touch roller 131. Since magnetic tape 100 joining with the wound roll 121 is thus pressed by touch roller 131 as the hub 111 rotates, magnetic tape 100 is wound along the outer peripheral surface (tapered surface) of hub 111. In plan view, the radius of the circle that is formed by the upper edge of wound roll 121 (this shall be referred to as the "upper radius R1") will be smaller than the radius of the circle that is formed by the lower edge of wound roll 121 (this shall be referred to as the "lower radius R2") (see FIG. 13B).

Figure 14A:
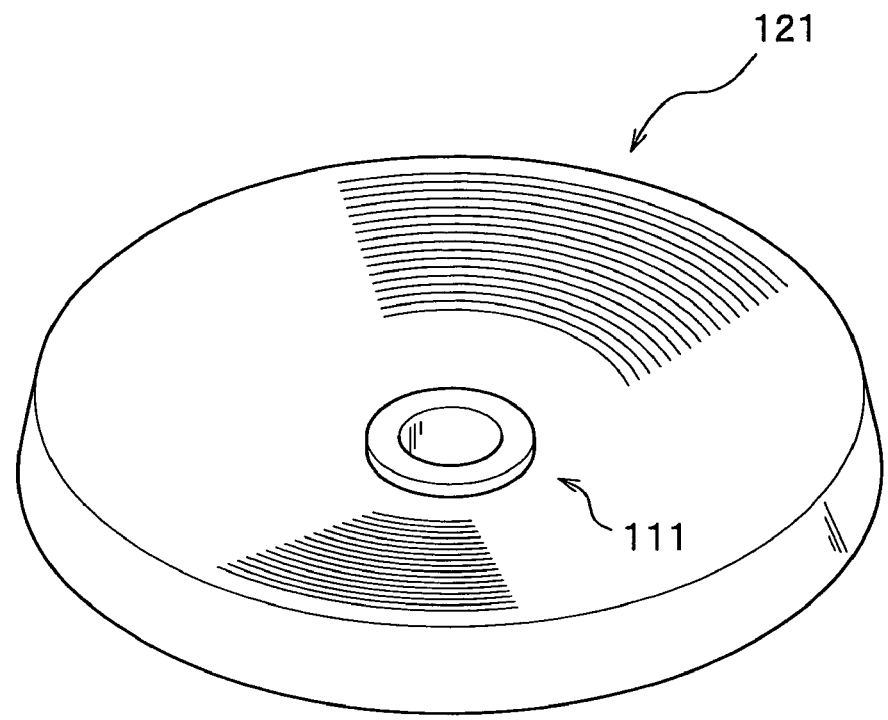
FIG. 14A is a perspective view of a wound roll wound by the tape processing method of the first embodiment.
Figure 14B:
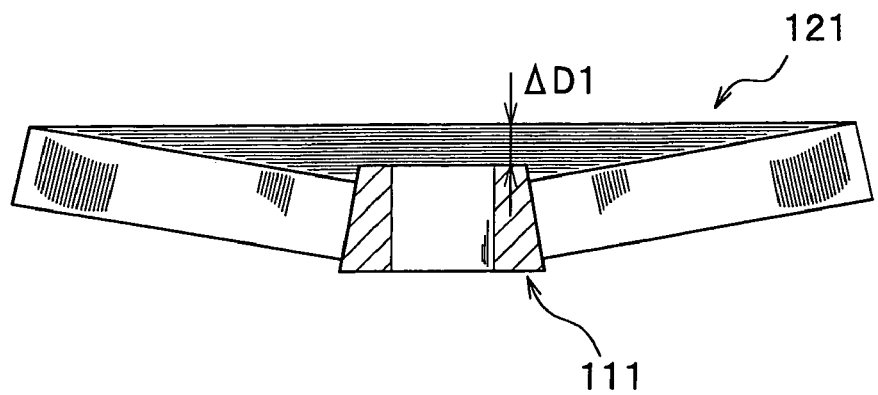
FIG. 14B is a sectional side view of the wound roll shown in FIG. 14A.

Then after winding for a predetermined number of turns, wound roll 121, with which the upper end surface is concave, is obtained as shown in FIG. 14A and FIG. 14B. More specifically, the upper side of wound roll 121 is made concave by the depth ΔD1.

<Second Step>

The second step of subjecting wound roll 121 to a heat treatment shall now be described.

[Heat Treatment Device]

Figure 15:
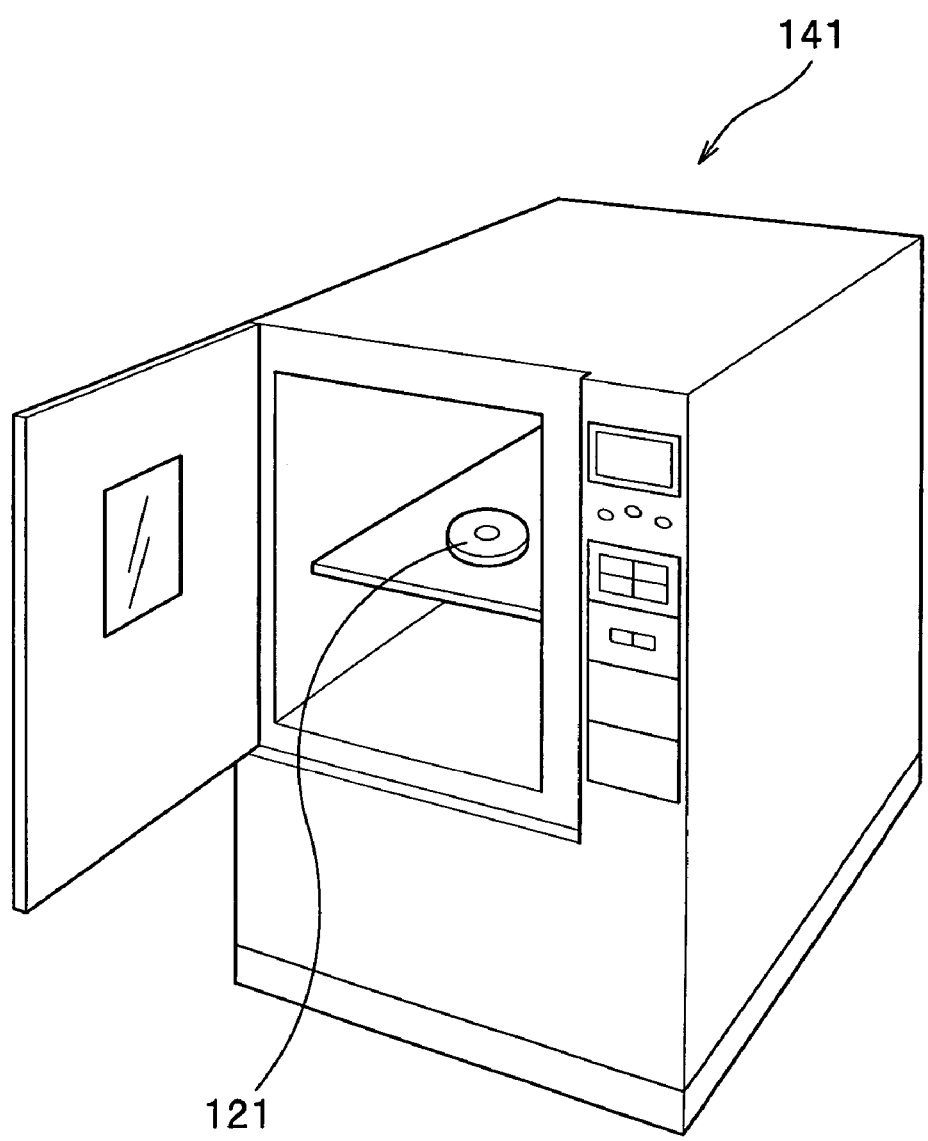
FIG. 15 is a perspective view of a heat treatment device used in the tape processing method of the first embodiment.
Figure 16:
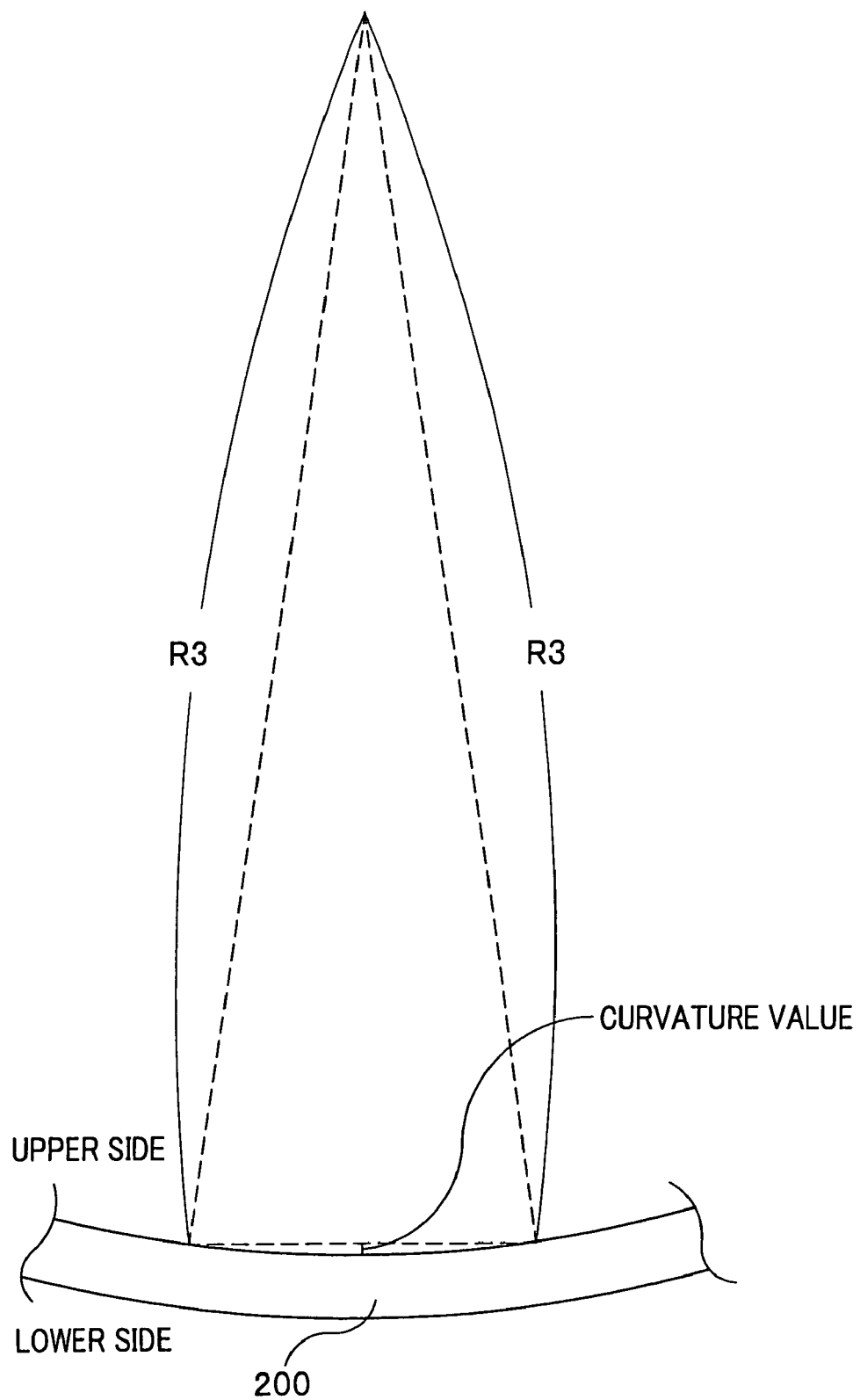
FIG. 16 is an enlarged view of a portion of the magnetic tape drawn out from the wound roll after the heat treatment.

First, a heat treatment device 141 to be used in the second step shall be described briefly with reference to FIG. 15. Heat treatment device 141 is not restricted in particular as long as the temperature and the heat treatment time can be set as desired and wound roll 121 can be heated to a predetermined temperature, and for example, a known thermostatic bath may be used. With heat treatment device 141, it is preferable that the humidity can be adjusted freely as well.

Using such a heat treatment device 141, wound roll 121, which was obtained in the first step, is heat-treated at a predetermined temperature for a predetermined time (for example, 24 hours).

Here, the predetermined temperature is set to a temperature directly below the glass transition temperature of the material of the base film that forms magnetic tape 1. To be more detailed, the predetermined temperature is set to a temperature that is lower than the glass transition temperature of the material that forms the base film. Such a heat treatment is generally referred to as annealing and is performed to lessen distortions of a molded polymer object by heating and slowly cooling the polymer object or to make the crystallization of a crystalline polymer proceed by heating the polymer to a temperature suited for crystallization.

To be more specific concerning the predetermined temperature, when, for example, polyethylene terephthalate (PET) is used as the material of the base film that forms magnetic tape 1, since the glass transition temperature of polyethylene terephthalate is 60 to 70° C., the predetermined temperature is set to 40 to 69° C. and more preferably to 50 to 65° C. When polyethylene naphthalate (PEN) is used as the material of the base film, since the glass transition temperature of polyethylene naphthalate is approximately 110 to 120° C., the predetermined temperature is set to 40 to 113° C. When aramid is used as the material of the base film, the predetermined temperature is set to 40 to 120° C. When the predetermined temperature is set to 100 to 120° C., the heat treatment speed can be made high.

Furthermore, by setting the interior of heat treatment device 141 to a predetermined humidity in accordance with the material of the base film, deformation of the base film can be promoted in a short time. For example, when polyethylene terephthalate (PET) is used as the material of the base film, the predetermined humidity is preferably set to 45 to 85%.

By heat treating wound roll 121 for the predetermined time under such a temperature, magnetic tape 100 can efficiently be made to memorize the shape of wound roll 121 that was wound around hub 111. Magnetic tape 100 can thus be provided with a winding curl.

Also, making the predetermined temperature in heat treatment device 141 directly below the glass transition temperature of the base film relaxes the amorphous portions inside the base film and reduces a residual stress while restraining extreme thermal contraction of the base film, thereby improving magnetic tape 100 in creep characteristics and lessening deformation with time. As a result, the curvature provided to magnetic tape 100 becomes less variable with the elapse of time.

After the elapse of the predetermined time, wound roll 121 is taken out from heat treatment device 141 to end the heat treatment step, and the temperature of wound roll 121 is lowered gradually to room temperature, preferably over a period of no less than 30 minutes.

<After the Heat Treatment>

After the temperature of wound roll 121 has been lowered, magnetic tape 200, which is drawn out from this wound roll 121, has a fixed upward curvature in the width direction across its entire length as shown in FIG. 5. The radius of curvature R3 (see FIG. 16) and the curvature value of magnetic tape 200 are adjusted as predetermined by suitably setting the upper radius R1 and the lower radius R2 of wound roll 121.

When magnetic tape 200 is thus curved in a fixed manner, magnetic tape 200 is readily restricted in the width direction during travel in a tape drive and is thus improved in traveling performance.

Furthermore, even if magnetic tape 200 is drawn out from wound roll 121 and wound around another hub (not shown), since the entirety of magnetic tape 200 is provided with a substantially fixed curvature, winding distortion does not occur readily.

As described above, with the tape processing method of the first mode, magnetic tape 200 can be provided with a fixed curvature across its entire length through simple steps.

Such a tape processing method of the first mode can be applied, for example, in a manufacturing line for magnetic tape 100 to manufacture a so-called pancake by winding magnetic tape 100 that has been cut from a web.

<<Second Mode>>

A second mode of a tape processing method shall now be described with reference to FIGS. 17A and 17B and FIG. 18.

<<Arrangement of the Tape Processing Method>>

Figure 17A:
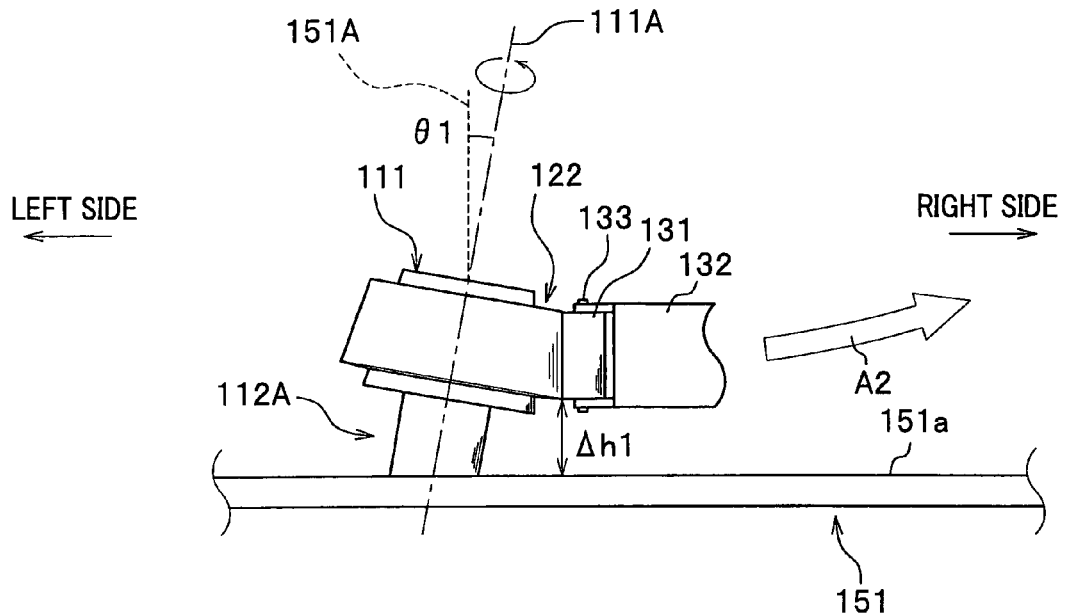
Figure 17B:
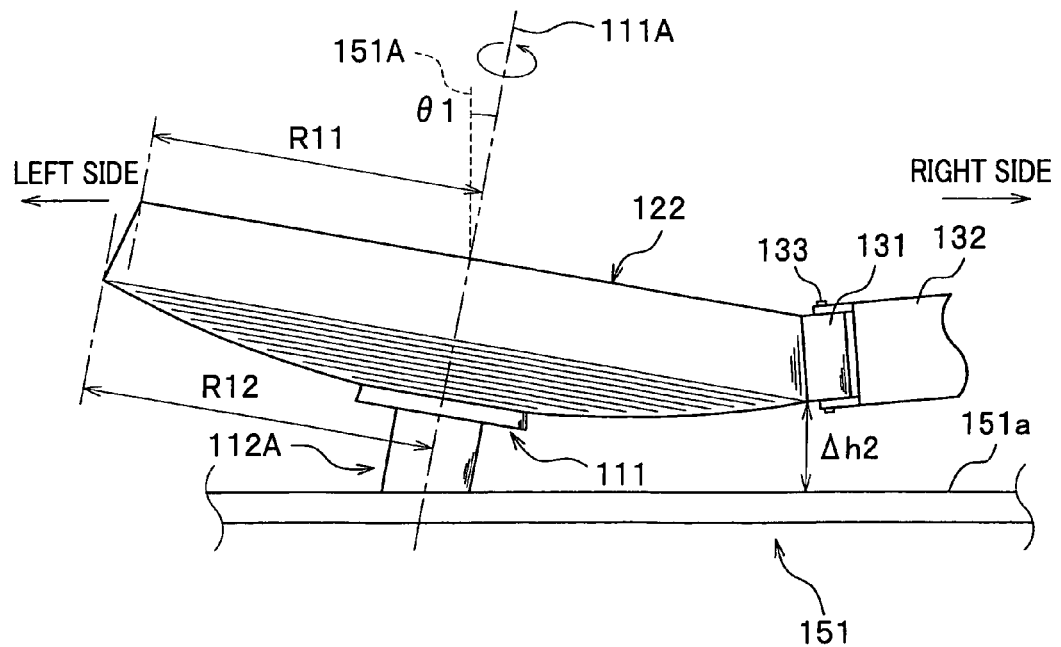
Figure 18:
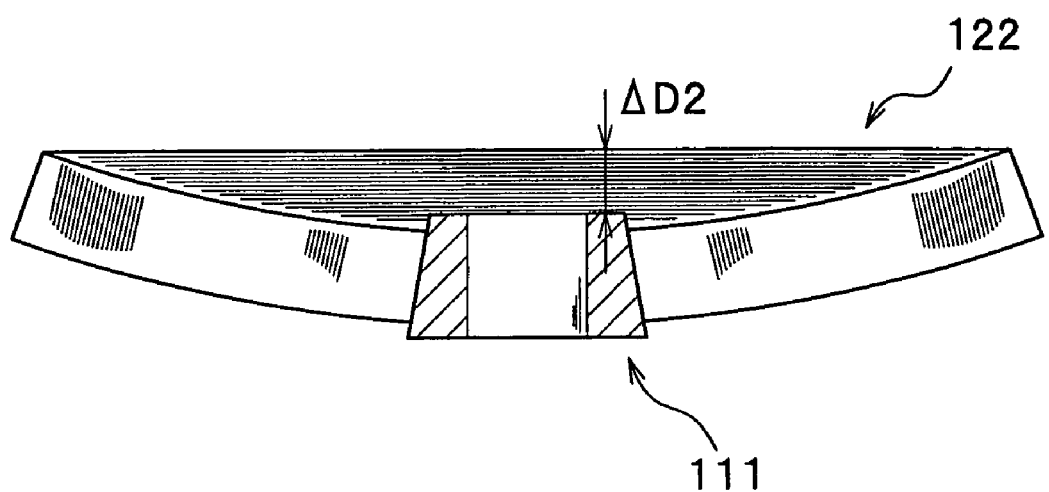
FIG. 18 is a sectional side view of a wound roll wound by the tape processing method of the second embodiment.

In comparison to the tape processing method of the first mode, the tape processing method of the second mode differs in the direction of movement of touch roller 131 in the first step (see arrow A2 in FIG. 17A). A depth $\Delta D2$ at the upper side of a wound roll 122 that is obtained is thereby made deeper than the depth $\Delta D1$ of wound roll 121 that is obtained by the first mode (see FIG. 18).

<First Step>

As shown in FIG. 17A, in the first step of winding magnetic tape 100 in the second mode, touch roller 131 is inclined upwards (towards one side) while being moved away to the right (outwards in the radial direction of the hub) as magnetic tape 100 is wound (see arrow A2). That is, touch roller 131 is moved in an arcuate or an inclining manner as viewed from the side. The height position of touch roller 131 is thus not fixed at the predetermined height $\Delta h1$ with respect to panel surface 151a but rises gradually as the winding proceeds (see FIG. 17A and FIG. 17B; $\Delta h1 < \Delta h2$).

A method of guiding touch arm 132 by an arcuate guide rail (not shown) of predetermined curvature and moving touch arm 132 in a manner coupled to the rotation speed of hub 111, etc., are available as an example of a method of moving touch roller 131 as described above.

Also since, as the position of touch roller 131 becomes high, the entry position at which magnetic tape 100 enters wound roll 122 becomes higher, the position of guide roller 113, which guides magnetic tape 100 towards wound roll 122 is made higher. As an example of a method of making the position of guide roller 113 higher, a guide roller elevating mechanism (not shown) may be arranged by combining a servo motor and a rack and pinion or other gear mechanism and making the degree of raising of guide roller 113 by the guiding guide roller elevating mechanism be in accordance with the winding of magnetic tape 100 by coupling it to the rotation speed of hub 111.

Thus moving guide roller 113 upward as the upper side of touch roller 131 becomes high allows magnetic tape 100 to travel with a predetermined interval being maintained with respect to panel surface 151a immediately before wound roll 122.

Thus moving touch roller 131 in accordance with the winding of magnetic tape 100 allows touch roller 131 to press the upper side of the outermost peripheral surface of wound roll 122 more readily at the position at which magnetic tape 100 enters wound roll 121. To be more specific, during the winding of magnetic tape 100, the outer peripheral surface of wound roll 122 can be pressed more readily with a pressure distribution, with which the maximum pressure lies at the upper side (one side) of the center in the width direction.

As the winding of magnetic tape 100 in this state is continued, a tape tension of a distribution such that the tape tension increases towards the upper side is generated in the longitudinal direction of magnetic tape 100 and the position at which magnetic tape 100 enters wound roll 122 shifts upwards. Wound roll 122 having the depth $\Delta D2$ that is deeper than the depth $\Delta D1$ of wound roll 121 of the first mode can thereby be obtained.

Also as the winding proceeds, the lower side of magnetic tape 100 at the outermost periphery of wound roll 122 opens outward in the radial direction and the difference between the upper radius R11 of wound roll 122 and the lower radius R12 of wound roll 122 becomes greater than the difference between the upper radius R1 and the lower radius R2 of the first mode.

<Second Step>

By then heat treating wound roll 122 in the same manner as in the first mode, magnetic tape 100 can be provided with a greater curvature at the same number of winding turns as the first mode.

<<Third Mode>>

Figure 19A:
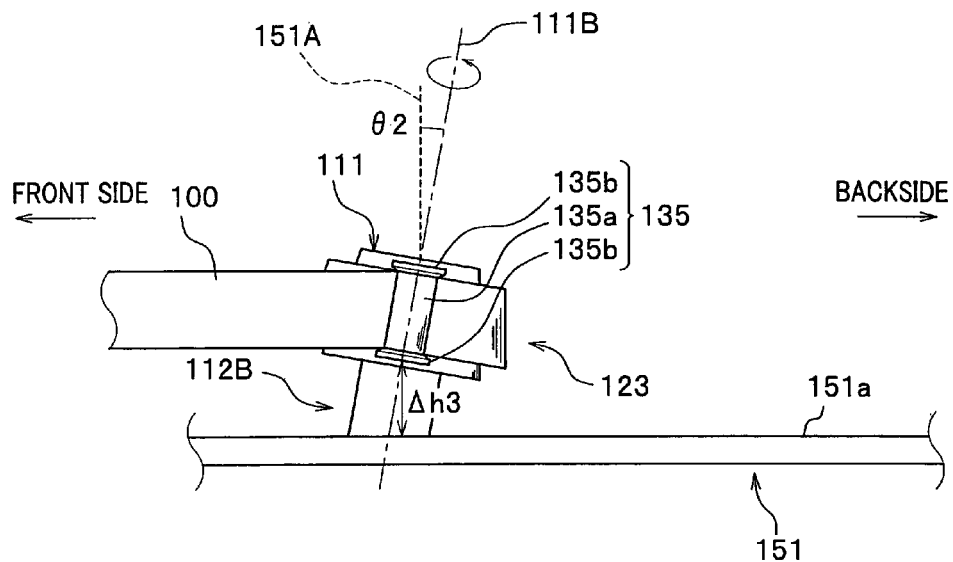
Figure 19B:
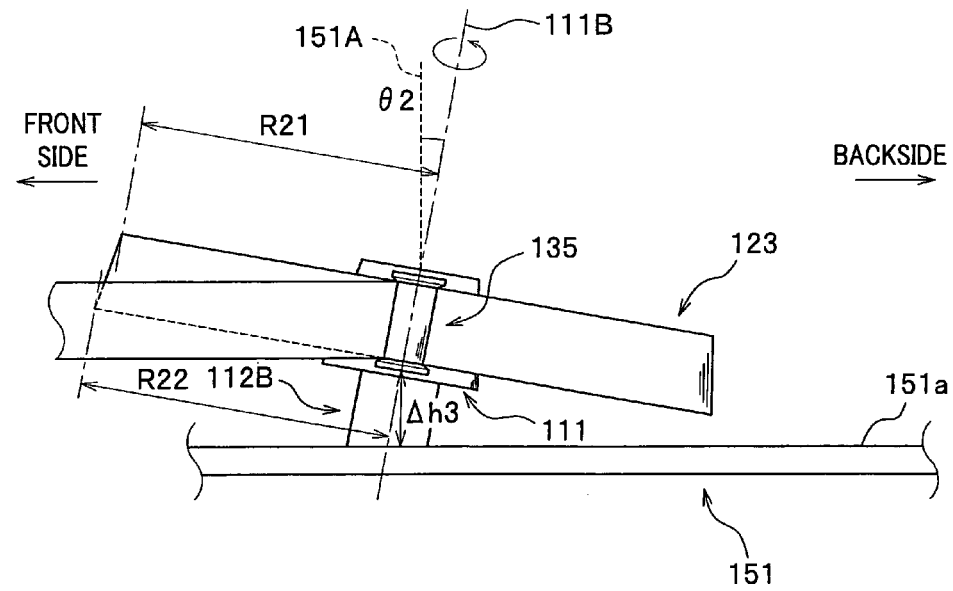
Figure 20A:
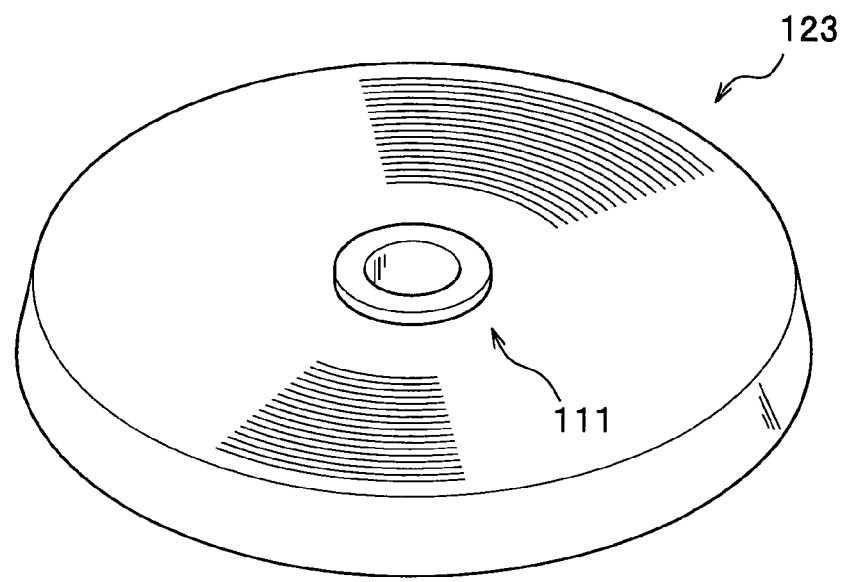
FIG. 20A is a perspective view of a wound roll wound by the tape processing method of the third embodiment.
Figure 20B:
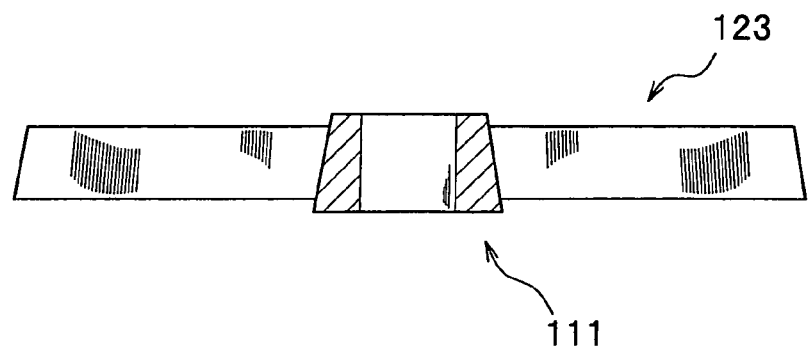
FIG. 20B is a sectional side view of the wound roll shown in FIG. 20A.
Figure 21A:
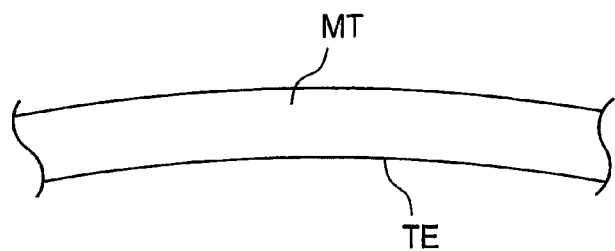
FIG. 21A is a schematic view of the state of a curved magnetic tape according to related art.
Figure 21B:
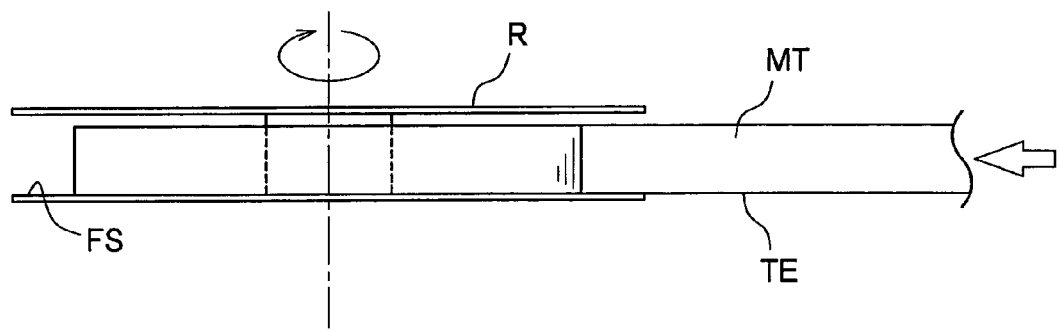
FIG. 21B is a conceptual view of the manner in which the magnetic tape of FIG. 21A is wound around a reel with flange according to related art.

A tape processing method of a third mode shall now be described with reference to FIG. 19 and FIG. 20. Of the drawings referenced, FIGS. 19A and 19B shows side views of the conditions of winding of a magnetic tape in the tape processing method of the third mode as viewed from the Y direction shown in FIG. 12, in which FIG. 19A shows a first stage, and FIG. 19B shows a second stage. FIG. 20A is a perspective view of a wound roll that has been wound by the tape processing method of the third mode. FIG. 20B is a sectional side view of the wound roll shown in FIG. 20A.

<<Arrangement of the Tape Processing Method>>

As shown in FIG. 19A, in comparison to the tape processing method of the first mode, the tape processing method of the third mode differs in that a hub rotation axis 111B and a spindle 112B are inclined towards the backside (towards the direction of travel of magnetic tape 100 immediately prior to entering a wound roll 123). That is, hub rotation axis 111B is inclined inwards at an inclination angle $\theta 2$ with respect to panel normal 151A or the width direction of the traveling tape 100.

Also with the third mode, touch roller 135 is used in place of touch roller 131 of the first mode. Touch roller 135 has a cylindrical main body portion 135a and flanges 135b at both ends of main body portion 135a. As in the first mode, touch roller 135 presses, from the right side, the entry position of magnetic tape 100 at a predetermined height $\Delta h3$ from panel surface 151a. Also, the rotation axis of touch roller 135 is parallel to hub rotation axis 111B. Touch roller 135 is made to move towards the right while maintaining the predetermined height $\Delta h3$ as the winding proceeds. The height position of touch roller 135 thus does not change even as the winding of magnetic tape 100 proceeds (see FIG. 19B).

<Winding of Magnetic Tape>

When magnetic tape 100 is wound in such a state, magnetic tape 100 is restricted in the width direction by flanges 135b of touch roller 135 and is bent in the direction of rotation of hub 111 at the entry position at which magnetic tape 100 enters wound roll 123 as shown in FIG. 19A. When being bent in this manner, magnetic tape 100 becomes thinner at the upper side and is made into wound roll 123, with which the upper radius R21 is smaller than the lower radius R22 (see FIG. 19B).

After winding by the predetermined number of turns, wound roll 123, such as shown in FIG. 20A and FIG. 20B, is obtained. The upper end surface of wound roll 123 is flat and not concave as in wound roll 121 of the first mode.

By then heat treating wound roll 123 in the same manner as in the first embodiment, magnetic tape 100 can be provided with a large curvature. In the above-described explanation, the rotation axis of touch roller 135 is parallel to hub rotation axis 111B. However, an upper side of the rotation axis of the touch roller 135 may be inclined toward the rotation axis of the hub 111B to make the outer circumferential surface of the touch roller 135 evenly touch the outer circumferential surface of the hub 1 or the wound roll 121.

Though examples of preferred modes of processing method have been described above, this invention is not limited to the above-described modes and the components described for the respective modes may be combined as suited and suitable changes, such as the following, can be made within a scope that does not fall outside the gist of this invention.

Though with the respective embodiments described above, magnetic tape 100 was subject to winding, this invention is not restricted thereto and may be applied to other tapes as well.

With the above-described first embodiment, a tapered roller (inclined roller), with which a taper that becomes greater in diameter at the upper side (one side) is formed on the outer peripheral surface, may furthermore be provided and magnetic tape 100 may be arranged to be wound upon being passed by this tapered roller. By thus further providing a step of stretching and thinning the upper side of magnetic tape 100 by being passed by the inclined roller, the difference between the upper radius R1 and the lower radius R2 of wound roll 121 can be made further greater. In this case, the degree of tapering of the tapered roller is set, for example, to approximately 0.1 to 5° in side view.

The method of stretching the upper side of magnetic tape 100 is not restricted to the above-described method of passing by a tapered roller, and a method of inclining a general guide roller with respect to the direction of travel of magnetic tape 100 may be employed instead.

With the above-described first mode, a step of gradually thinning the thickness of magnetic tape 100 towards the upper side (one side) may furthermore be provided prior to the first step of winding magnetic tape 100. That is, a step of thinning one end side (upper side) of magnetic tape 100 in correspondence to the smaller diameter side (upper side) of hub 111 may furthermore be provided. Thinning the upper side of magnetic tape 100 makes the difference between the upper radius R1 and the lower radius R2 of wound roll 121 further greater. As a result, magnetic tape 200 after the heat treatment (see FIG. 16) can be curved greatly towards the upper side.

As examples of methods of thinning the thickness of the upper side of magnetic tape 100, a method of varying the thickness of the magnetic layer coated onto the base film, a method of grinding the surface of magnetic tape 100 by a blade or grindstone, etc., are available. In such a case, magnetic tape 100 is preferably thinned gradually towards the upper side so that the difference between the thickness of the uppermost side and the thickness of the lowermost side of magnetic tape 100 will be approximately 3 to 20 nm.

Also as shall be described later, in the case where the upper and lower sides of hub 111 are inverted and the lower side is made smaller in diameter, the thickness of magnetic tape 100 is made gradually thinner towards the lower side. In this case, magnetic tape 200 after the heat treatment is curved downwards.

Though with the first and second modes described above, cases where hub rotation axis 111A of hub 111 upper side of which is smaller in diameter is inclined towards the right (towards the position at which magnetic tape 100 enters wound roll 121 or 122) was described, hub rotation axis 111A may be inclined towards the left (in the direction opposite to the position at which magnetic tape 100 enters wound roll 121 or 122) instead.

In the case where hub rotation axis 111A is inclined towards the left (in the direction opposite to the entry position of magnetic tape 100), the upper and lower sides of hub 111 are inverted so that the lower side becomes smaller in diameter, in other words, the taper of the outer peripheral surface of hub 111 is inverted.

Though with the third mode described above, the case where hub rotation axis 111B is inclined towards the backside (in the direction of progress of magnetic tape 100 immediately prior to entering wound roll 123) was described, hub rotation axis 111B may be inclined towards the front (in the direction opposite to the direction of progress of magnetic tape 100 immediately prior to entering wound roll 123) instead.

In the case where hub rotation axis 111B is inclined towards the front (in the direction opposite to the direction of progress of magnetic tape 100), the upper and lower sides of hub 111 are inverted so that the lower side becomes smaller in diameter, in other words, the taper of the outer peripheral surface of hub 111 is inverted.

In the above-described embodiment shown in FIGS. 12, 13A, 13B, 17A, 17B, and 18, the tape 100 is wound on the hub 111 including the tapered outer circumferential surface, in which one side of the hub 111 is smaller than the other side thereof in diameter. The rotation axis 111A of the hub 111 is inclined in a first plane (including the rotation axis 11A and the entry position) perpendicular to the traveling direction of the tape 100 prior to winding of the tape 1 on the hub 111 to make a second plane 1a tangential to the outer circumferential surface and to a tape supplying side (guide roller 113) across a width of the tape 1. The tape 100 is wound on the tapered outer circumferential surface of the hub 111 and an outermost peripheral surface of the wound roll is pressed with the touch roller 131 to generate winding curl of the tape 100 wounded on the hub 111. Then, the heat treatment of the wound roll 121 is performed within the predetermined temperature range directly below the glass transition temperature of the base film to fix the winding curl.

The invention claimed is:

1. A tape winder comprising:
    a hub for winding a tape to form a tape roll on an outer peripheral surface thereof;
    a first guide roller for defining a position where the tape is fed onto the tape roll while pressing an outer peripheral surface of the tape roll; and
    a first moving mechanism for moving the first guide roller away from the rotation axis of the hub as the tape roll increases in diameter; wherein
    a rotation axis of the hub intersects the rotation axis of the first guide roller at an angle $\theta$.

2. The tape winder according to claim 1, wherein the outer peripheral surface of the hub is tapered and inclined at the angle $\theta$ with respect to the rotation axis of the hub.

3. The tape winder according to claim 1, further comprising:
    a second guide roller, positioned at an opposite side of the first guide roller across the hub and restricting wobbling in a width direction of the tape, wound overlappingly around the outer peripheral surface of the tape roll, while pressing the outer peripheral surface of the tape roll; and
    a second moving mechanism, moving the second guide roller away from a rotation axis of the hub as the tape roll increases in diameter; wherein
    the rotation axis of the first guide roller is positioned along a normal to a reference surface that is set in advance and a direction in which the second guide roller moves away from the rotation axis of the hub is set to form an angle $2\theta$ with respect to the reference surface.

4. The tape winder according to claim 3, wherein the second guide roller is freely movable in the width direction of the tape.

5. The tape winder according to claim 3, wherein each of the first guide roller and the second guide roller includes at an upper edge and a lower edge of the outer circumferential surface thereof a pair of flanges, which restrict wobbling in the width direction of the tape, and an interval between inner circumferences of the flanges along the outer circumferential surface of each of the first guide roller and the second guide roller is 5 to 15 μm greater than the width of the tape.

6. The tape winder according to claim 5, wherein an interval between of outer circumferences of the flanges of each of the first guide roller and the second guide roller is 20 to 100 μm greater than the width of the tape.

7. The tape winder according to claim 6, wherein the height of each flange formed on the first guide roller and the second guide roller is 0.5 to 2.0 mm.

8. The tape winder according to claim 3, further comprising: first and second actuators that are attached respectively to the first guide roller and the second guide roller, respectively and individually generating pressing forces of the first guide roller and the second guide roller against the outer peripheral surface of the tape roll.

9. The tape winder according to claim 8, further comprising: a touch roller, positioned downstream of the first guide roller with respect to a winding direction of the tape and pressing the outer peripheral surface of the tape roll.

10. The tape winder according to claim 9, further comprising: a third actuator that is attached to the touch roller and generates a pressing force of the touch roller against the outer peripheral surface of the tape roll separately from the first guide roller and the second guide roller.

11. The tape winder according to claim 10, further comprising first to third dampers, wherein the first to third actuators are arranged to press the first guide roller, the second guide roller, and the touch roller towards the outer peripheral surface of the tape roll via the first to third dampers, respectively.

12. The tape winder according to claim 11, further comprising:
    first and second sliders, onto which the first and second guide rollers are mounted, respectively;
    a third slider, onto which the touch roller is mounted; and
    first to third guide rails, guiding the first to second sliders towards the tape roll, respectively; wherein
    the first to third actuators are linear actuators that respectively move the first to third sliders individually.

13. The tape winder according to claim 3, further comprising: a touch roller, positioned downstream of the first guide roller with respect to a winding direction of the tape and pressing the outer peripheral surface of the tape roll.

* * * * *